United States Patent [19]
Du et al.

[11] Patent Number: 5,694,591
[45] Date of Patent: Dec. 2, 1997

[54] REDUCING QUERY RESPONSE TIME USING TREE BALANCING

[75] Inventors: Weimin Du, San Jose; Ming-Chien Shan; Umeshwar Dayal, both of Saratoga, all of Calif.

[73] Assignee: Hewlett Packard Company, Palo Alto, Calif.

[21] Appl. No.: 434,101

[22] Filed: May 2, 1995

[51] Int. Cl.$^6$ .................................................. G06F 17/30
[52] U.S. Cl. ........................... 395/602; 395/610; 395/604
[58] Field of Search .................................. 395/602, 610, 395/604

[56] References Cited

U.S. PATENT DOCUMENTS

| | | | |
|---|---|---|---|
| 5,412,804 | 5/1995 | Krishna | 395/600 |
| 5,412,806 | 5/1995 | Du et al. | 395/600 |
| 5,446,886 | 8/1995 | Li | 395/600 |
| 5,495,605 | 2/1996 | Cadot | 395/600 |

OTHER PUBLICATIONS

Chen et al, "using Segmented Right-Deep Trees for the Execution of Pipelined Hash Joins", Proc of the 18th Intl Conf on Very Large Databases, pp. 15–26, Jun. 1, 1992.

Swami et al, "A Polynominal Time Algorithm for Optimizing join Queries", PROC Ninth Intl Conf on Data Engineering, pp. 345–354, 19–23 Apr. 1993.

Harada et al, "Evaluation of Linear Join Processing Trees in Shared–Nothing Database Environment", Proc ICCI '93, pp. 413–417, May 29, 1993.

Zhu et al, "A Query Sampling Method for Estimating Local Cost Parameters in a Multidatabase System", Proc of the 10th Intl Conf Data Engineering, 14–18 Feb. 1994, pp. 145–153.

Dayal, Umesh, "Processing Queries Over Generalization Hierachies in a Multidatabase System", In Proc. VLDB 1983, pp. 342–353.

Brill, David et al., "Distributed Query Processing Strategies in Mermaid, a Frontend to Data Management Systems", In Proc. IEEE Data Engineering, Los Angeles, CA, 1984, pp. 211–218.

Hong, Wei and Stonebraker, Michael, "Optimization of Parallel Query Execution Plans in XPRS", Distributed and Parallel Databases, vol. 1, No. 1, 1993, pp. 9–32.

Du, Weimin et al., "Query Optimization in Heterogeneous DBMS", Proceedings of the 18th VLDB Conference, Vancouver, British Columbia, Canada, 1992, pp. 277–291.

Hong, Wei, "Exploiting Inter–Operation Parallelism in XPRS", Association of Computing Machinery, SIGMOD, Jun. 1992, pp. 19–28.

Selinger, P. Griffiths et al., "Access Pathe Selection in a Relational Database Management System", ACM SIGMOD, 1979, pp. 82–93.

Arbee L. P. Chen, "Outerjoin Optimization in Multidatabase Systems", IEEE, 1990, pp. 211–218.

*Primary Examiner*—Wayne Amsbury

[57] ABSTRACT

A method for optimizing data retrieval from a multidatabase system by restructuring a database query tree to optimize query response time in a two step optimization process. First, the query tree is transformed into a left deep join tree having a root query, a plurality of subordinate (descendant) query nodes and a plurality of table nodes, each subordinate query node having a left child subtree and a right child subtree. This transformation is usually the result of a first optimization scheme such as System-R. A response time for the root query and for each of the plurality of subordinate query nodes is estimated and access response times to each table node and subtree are estimated. Then, this data is utilized in the balancing of the left deep join query tree so that the cost for access to each left child subtree is substantially equal to the cost for the right child subtree. This balancing step encompasses the second phase of the query tree optimization process and includes using transformation processes such top-down, bottom-up, and a hybrid of the first two. Finally, the query is executed in a relational database to retrieve data responsive to the query in accordance with an execution plan operating according to the balanced query tree.

11 Claims, 20 Drawing Sheets

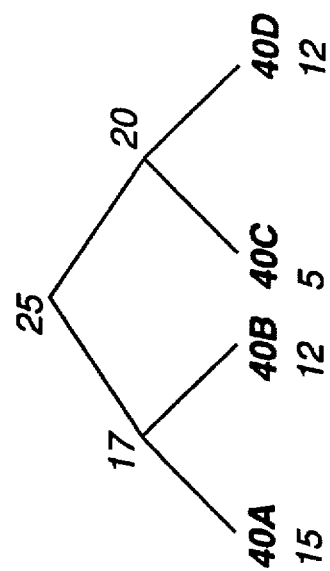
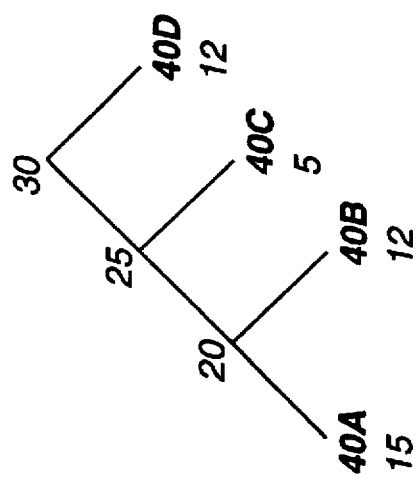
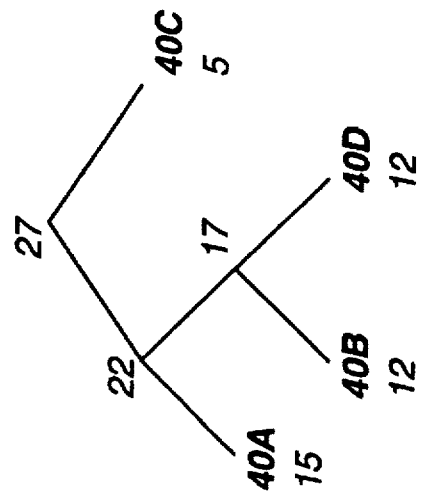
FIG. 4C
FIG. 4B
FIG. 4A

FIG. 5

```
Top Down(N) {
    L = left-child(N);
    R = right-child(N);
    if (leaf(L) = true) return;
    else if (response-time(L) <= response-time(R)) {
        Top-Down(L);
        Top-Down(R);
    }
    else { /* response-time(L) > response-time(R) */
        LAN=Find-LAN(N);
        if (LAN != null) {
            Transform(N,LAN);
            Top-Down(L);
        }
        else { /* no transformation for N */
            Top-Down(L);
            if (response-time(L) < response-time(R))
                Top-Down(R);
        }
    }
    return;
}
```

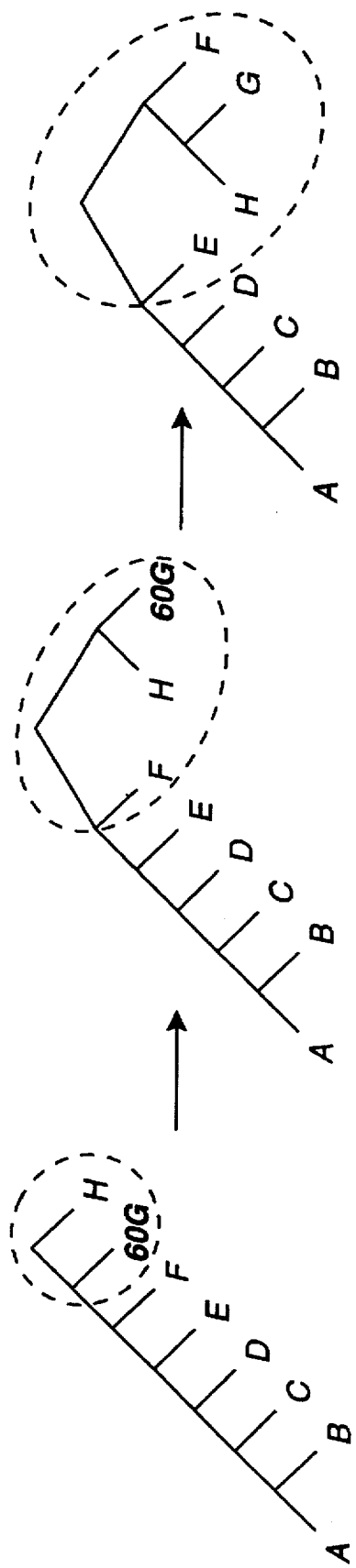
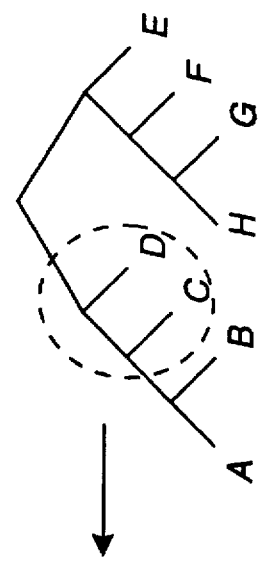
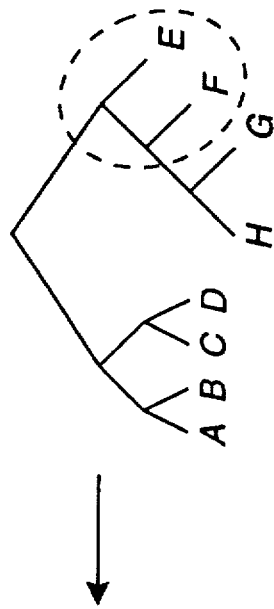
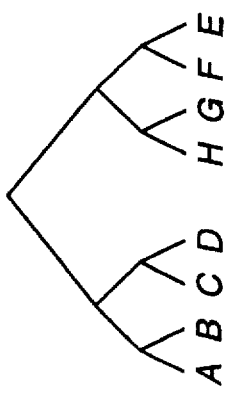
FIG. 6A  FIG. 6B  FIG. 6C  FIG. 6D  FIG. 6E  FIG. 6F

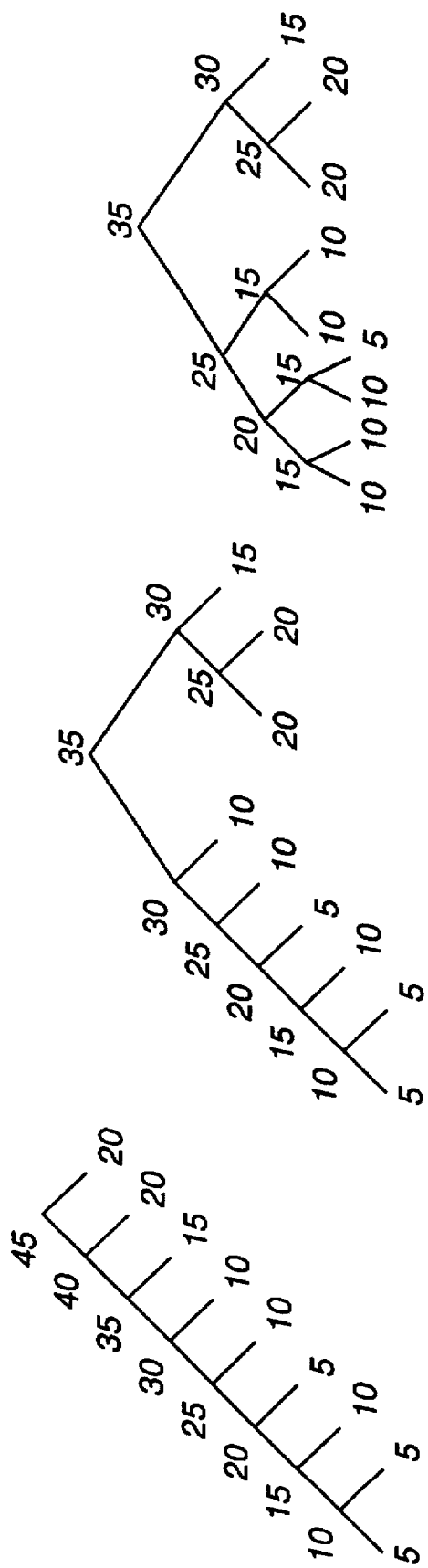

FIG. 8

```
Bottom-Up(N) {
    L = left-child(N);
    R = right-child(N);
    if (leaf(L) = true) return;
    else if (response-time(L) > response-time(R)) {
        Bottom-Up(L);
        LAN = Find-LAN(N);
        if (LAN != null) {
            Transform(N, LAN);
            if (response-time(N J N) > response-time(sibling((N J N)))
                Bottom-Up(N J N);
        }
    }
    else {} /* response-time(L) <= response-time(R) */
    return;
}
```

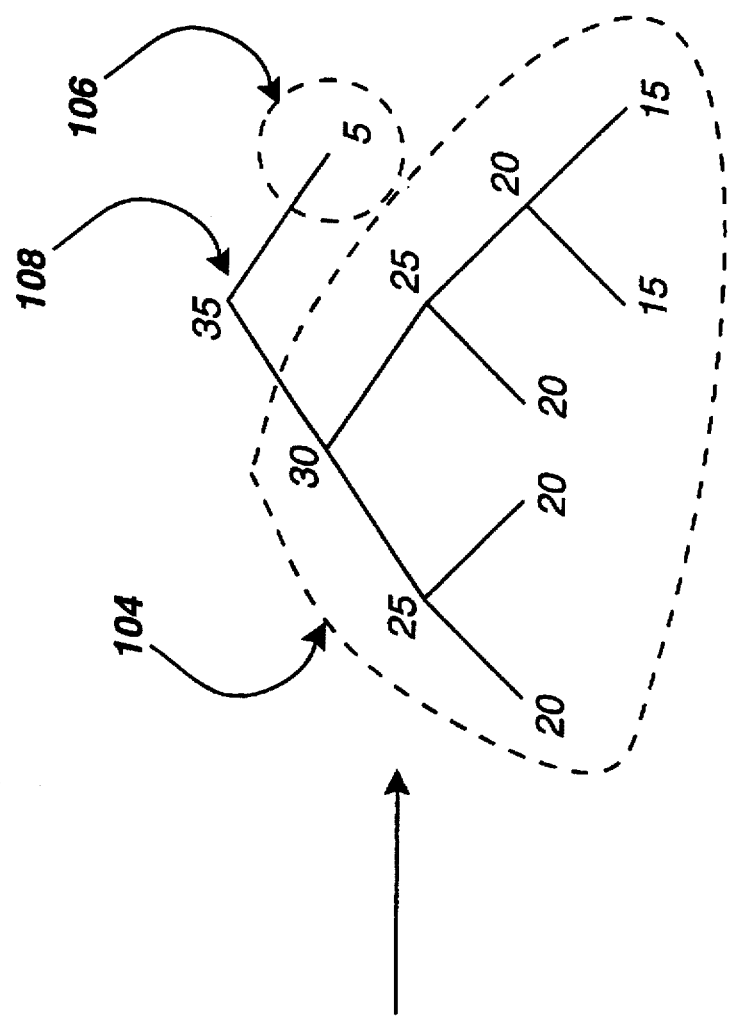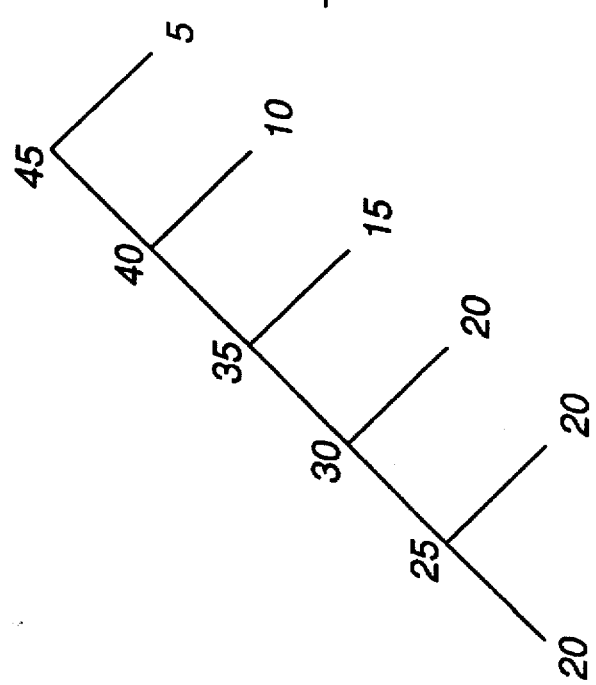
FIG. 10

FIG. 11

```
Hybrid(N₁,N₂) {
    loop
        L₁ = left-child(N₁);
        R₁ = right-child(N₁);
        L₂ = left-child(N₂);
        R₂ = right-child(N₂);
        if (response-time(L₁) <= response-time(R₂)) {
            LAN = Find-LAN(N₁);
            if (LAN != null) {
                Transform(N₁, LAN);
                if (response-time(N J N) > response-time(sibling((N J N)))
                    Hybrid(parent(leftmost-leaf(N J N)), N J N);
                N₁ = parent(N₁); /* bottom-up */
            }
        }
        else { /* (response-time(L₁) > response-time(R₂)) */
            LAN = Find-LAN(N₂);
            if (LAN != null) {
                Transform(N₂, LAN);
                if (response-time(N J N) > response-time(sibling((N J N)))
                    Hybrid(parent(leftmost-leaf(N J N)), N J N);
            }
            N₂ = L₂; /* top-down */
        }
    Until (N₁ = N₂);
}
```

REDUCING QUERY RESPONSE TIME USING TREE BALANCING

A portion of the disclosure of this patent document contains material which is the subject of copyright protection. The copyright owner has no objection to facsimile reproduction by anyone of the patent document or the patent disclosure, as it appears in the U.S. Patent and Trademark Office file or records, but otherwise reserves all copyrights whatsoever.

BACKGROUND OF THE INVENTION

This invention relates to multi-computer systems, and more particularly to database management system query execution strategies for retrieval of data stored within multidatabase systems.

A database management system (DBMS) is a computer system for recording and maintaining data. In a distributed DBMS, there are multiple computer sites, each with a local database connected together in a communications network, in which a user at any site can access data stored at any other site. A major objective of distributed database systems is to provide what is typically called location transparency, meaning that users should not need to know at which site any given piece of data is stored, but should be able to behave as if the entire database were stored at their local site. Thus, an external data source (EDS) may be imported by the DBMS from a remote site and integrated into a global view or compilation of the data as requested by the user at the local site.

A relational database management system stores data as rows in tables, and refers to a collection of tables as a database. Users or application programs manipulate (select, update, insert, or delete) data by issuing requests or commands (called queries) against the database. In a relational database management system's data query and manipulation language, such as SQL, requests are nonprocedural. That is, users or application programs simply specify what is wanted, rather than specifying how to accomplish it. The system's optimizer has the responsibility for determining the optimal strategy for obtaining the data. Accordingly, each processing strategy will have an associated cost in computer processing time to access data in response to the query. The goal of optimization then is the selection of a least cost strategy.

Each computer site has a DBMS in its own right: It has its own terminals and users, its own local storage and CPU (central processing unit), running its own database and database administration functions (i.e. a local DBMS). It also has its own data communications manager with the additional responsibility for controlling the exchange of messages with other sites in the overall distributed database system. While the distributed DBMSs may be homogeneous in that each performs in the same fashion with the same operating system, this is not usually the case. Rather, the individual database systems will usually be from different manufacturers, where the overall system is often referred to in the literature as a multidatabase system, or MDBS. A MDBS must support various database systems with different database models, languages, and services and must integrate autonomous and possibly heterogeneous EDSs.

An example of a two-part MDBS system is shown in FIG. 14. The example represents a simple distributed banking system with two sites, for example, one in Portland, Oreg. and one in San Francisco, Calif.. Of course real distributed systems, such as that depicted in FIG. 15, usually involve more than just two sites. But suppose account records for the San Francisco area are stored in a local database at the S.F. site, while account records for the Oregon area are stored in a local database at the Portland site. Suppose further that the two sites are linked together to form a single "global" or distributed database. The system combines efficiency of processing (the data is stored close to the point where it is most frequently used) with increased accessibility (it is possible to access a San Francisco account from Portland, Oreg., and vice versa, via a communications link).

The basic problem is that a distributed database system such as in FIG. 15 is a collection of sites, or nodes in a network, and networks, at least long haul networks, are slow. Long haul networks, which links geographically dispersed sites, use telephone lines, in which the data rate is typically 50K–100K bits per second or less. Thus, an overriding objective in distributed database systems is to minimize the number and volume of messages. This objective in turn gives rise to problems in subsidiary areas, and in particular here, query processing.

The problem of query processing, particularly in the MDBS environment, focuses on optimization which, accordingly, is the single most important consideration in distributed systems design. Optimization is the process that, for a given query, determines the optimum "execution" or "application" plan. An optimizer is a major subcomponent of the system responsible for producing an application plan (i.e., the machine code instructions to implement SQL statements). In the distributed system, an application plan must take into consideration multiple database systems, in a networked setting, with attendant overheads such as network communications speed mentioned above. Therefore, optimization is crucial to effective query processing, particularly in the MDBS environment.

Time is also spent during access of the database itself. Relational DBMSs store rows of tables in data pages on physical storage devices such as disk or tape drives. Data is transferred between the physical storage and the computer system's central processing unit (CPU) page by page, even though only a single row may be needed from a given data page. The time it takes to transfer data between physical storage and the processing unit is many times greater than the time it takes to process the data in the processing unit. Furthermore, the time it takes to randomly access separate physical data pages is as much as ten times longer than the time needed to sequentially access adjacent data pages. To manipulate data in a relational data base, the rows must first be transferred from physical storage to the processing unit, then processed in the processing unit, and finally transferred back to physical storage. Because transferring takes so much longer than processing, the total time required to manipulate the data can be dramatically reduced if the number of transfers can be reduced.

The data access strategy chosen by a system optimizer specifies the exact way to structure a query (or access path) for obtaining and processing the data pages of a table. These data pages are usually organized within a relational DBMS in indexes whereby each index entry contains a key value and an identifier or pointer to the one or more rows of the table that contain the key value. Indexes are in turn stored on index pages in query tree form where there is a root page, intermediate pages that are dependent on the root page, and index leaf pages at the lowest level of the tree. Referring to the query tree shown in FIG. 2, the root and dependent nodes may be chosen so as to equalize (as much as possible) the frequencies with which a search will end in the left and right subtrees. The frequencies are often directly proportional to the size of the data table. The resulting tree structure is called a "balanced bushy tree" and serves as a useful organizational tool for query access optimization.

The type of indexing involved, whether sequentially clustered or nonclustered, can determine what optimization plan would be most useful. An index is a "clustering index" if an index sequential scan causes only a single access of each data page. Sequential scans through clustering indexes are fast because the number of data page accesses to the same data page is minimized. In nonclustering indexes, sequential scans access pages at random and may result in duplicated querying of each page of data, thereby slowing the data access query rate. However, this method may be locally optimal in certain circumstances.

As in traditional homogeneous distributed DBMSs, query optimization is important in MDBSs. Unfortunately, this problem has so far received little attention. Since the basic query optimization paradigm is the same in both environments, it has been assumed that the traditional query optimization strategy described in P. Selinger et al, *Access Path Selection in a Database Management System, In Proc.* ACM SIGMOD, 1979 (e.g. System-R style) also works in MDBSs. While this is true to some extent, differences between MDBSs and homogeneous distributed DBMSs are significant enough to require a reexamination of certain query optimization issues in MDBSs.

Other methods have been suggested which attempt to solve the optimization problem for multidatabase queries but have met with limited success. D. Brill et al., *Distributed Query Processing Strategies in Mermaid, A Frontend to Data Management Systems*, In Proc. *IEEE Data Engineering*, Los Angeles, Calif. (1984) proposed query processing methods for multidatabase queries that use semi-join and take advantage of data replication. U. Dayal, *Processing Queries Over Generalization Hierarchies in a Multidatabase System*, In Proc. VLDB 1983, and *Springer Verlag Query Processing in Multidatabase System*, In Query Processing in Database Systems (Kim, Batory and Reiner (eds.), 1985), discussed how traditional operations (e.g., selection, join, etc.) can be optimized in conjunction with generalization operations such as outer union and outer join. A. Chen, *Outerjoin Optimization in Multidatabase Systems*, In Proc. Distributed and Parallel Database Systems, Dublin, Ireland (1990) proposed heuristic rules that convert outer-joins introduced by integration into one-side outerjoins, or even regular joins. W. Duet al., *Query Optimization in a Heterogeneous DBMS. In Proc. VLDB*, Vancouver, Canada (1992) discussed how traditional System-R style optimization technique can be applied to multidatabase systems, with emphasis on calibration of EDS cost models and estimation of external subquery costs. The problem of improving response time addressed herein is orthogonal to the problems studied in these other papers, and the disclosed techniques of the present invention can be used in conjunction with any of the aforementioned optimization techniques.

The Problem

From a query processing point of view, the major difference between an MDBS and a homogeneous DBMS is that EDSs in an MDBS are independent and autonomous DBMSs and were not designed to participate and cooperate in distributed query processing. This difference has great impact on multidatabase query execution.

For example, sort merge join and hash join operations are more often favored to implement global joins in MDBSs. Since each EDS is an independent and autonomous DBMS, the MDBS can only interact with it via its Application Programming Interface (e.g., at the SQL level). In other words, an MDBS is unable to access internal data structures and functions of its EDSs. Clearly, there is an overhead cost associated with each EDS access. Although the overhead is not significant in a single access, it dominates the cost of operations that require repeated EDS accesses. As a consequence, nested loop join operations can become expensive, and can be expected to out-perform sort merge join and hash join operations only when the first table queried or outer table is very small.

On the other hand, sort merge and hash joins provide good inter-operator parallelism in a balanced (e.g., bushy) query tree, but bad response time in an unbalanced (e.g., left deep) query tree, due to long hierarchical delay of sort merge and hash joins. The hierarchical delay of a join node operation is defined to be the time span between the moment its subordinate join nodes produce last results and the moment it does so. In general, join node operations implemented using sort merge and hash join incur long hierarchical delay, due to the time needed to sort input data and build hash table. Unfortunately, most traditional query optimization strategies generate only left deep join trees and, therefore, are unacceptable in MDBSs, especially with respect to response time.

Consequently, a need exists for a basic optimization scheme which both minimizes access time within multidatabase systems and can be used in conjunction with other optimization methods.

SUMMARY OF THE INVENTION

The present invention is directed to this aspect of the multidatabase query optimization problem, namely improving response time of unbalanced left deep join trees. Thus, since the space of possible balanced or bushy trees is large and may involve a great expenditure or resources, it may be more optimal to select an unbalanced or left deep tree and balance it via simple transformations. The strategy works in two steps: first, a traditional cost-based (e.g., System R style) optimization process is employed to obtain a left deep join execution plan which is optimal with respect to total resource usage; then, the plan is improved (with respect to response time) using the proposed transformations. Further, basic transformations and processes are described which effectively apply the transformations to a left deep join tree.

The idea of two phase optimization was also adopted by Hong and Stonebraker for parallel query optimization in *Optimization of Parallel Query Execution in XPRS*, In Distributed and Parallel Databases, Vol. 1, No. 1, 1993 and *Exploiting Inter Operation Parallelism in XPRS*, In Proc. ACM SIGMOD, San Diego, Calif., 1992. However, the present invention differs from previous two phase optimizers in the following important and novel aspects. First, though the purpose of previous optimizers was to parallelize a given query tree (left deep or bushy) without changing the tree structure, the present method transforms a left deep join tree into a more balanced bushy join tree. Second, previously known two-phase optimization strategies were intended to cope primarily with the problem of unknown run-time parameters at compile time and therefore the second phase must be performed at run time. The present method, on the other hand, is directed to poor response times due to unbalanced left deep join trees which is completely addressed at compile time.

It is thus the purpose of the present invention to fulfill the following objectives:

One object of the invention is to always select better (at least no worse) execution plans (with respect to response time) than a traditional System-R style optimizer.

Another object of the invention is to assure that the final execution plan is globally optimal with respect to total resource usage. This is the case since the second phase starts with a total cost optimal execution plan whereby each transformation will improve response time without an increase of total resource usage.

The present invention has additional advantages. First, it reduces the optimization complexity as compared to exhaustive ones by searching only the space of bushy trees. In fact, the complexity is comparable to that of the traditional optimization process which searches only left deep join trees, since the cost of the first phase dominates that of the second phase. Finally, the form of the present invention allows it to be easily incorporated into existing query optimizers.

More particularly, the inventive method for optimizing data retrieval from a multidatabase system by restructuring a database query tree to optimize query response time comprises several steps. First, the query tree is transformed into a left deep join tree having a root query, a plurality of subordinate (descendant) query nodes and a plurality of table nodes, each subordinate query node having a left child subtree and a right child subtree. This transformation is usually the result of a first optimization scheme such as System-R. A response time for the root query and for each of the plurality of subordinate query nodes is estimated and access response times to each table node and subtree are estimated. Then, this data is utilized in the balancing of the left deep join query tree so that the cost for access to each left child subtree is substantially equal to the cost for the right child subtree. This balancing step encompasses the second phase of the query tree optimization process. Finally, the query is executed in a relational database.

The foregoing and other objects, features and advantages of the invention will become more readily apparent from the following detailed description incorporating several examples which implement the invention, which proceeds with reference to the accompanying drawings.

BRIEF DESCRIPTION OF THE DRAWINGS

FIG. 4A is a diagram showing a single transformation of the join tree of FIG. 4B using the basic transformation illustrated in FIGS. 3A and 3B according to the invention.

FIG. 4B shows a sample left-deep join tree with attached costs for each table and response times for each join node.

FIG. 4C shows a more balanced tree produced by the basic transformation of the left-deep join tree of FIG. 4B that is selected by an extended process.

FIG. 5 is a listing of code for implementing the Top-Down Approach according to the invention.

FIG. 6A–6F show an example of the five step top-down transformation shown in FIG. 5 as applied to the generic left-deep join tree shown in FIG. 6A, showing intermediate FIGS. 6B–6E, and yielding the balanced bushy join tree shown in FIG. 6F.

FIGS. 7A–7C show problems which can occur with top-down transformations by showing the transformation of a left-deep join tree diagrammed at FIG. 7A, with intermediate FIG. 7B, and yielding a bushy tree which is not well balanced at FIG. 7C.

FIG. 8 is a listing of code for implementing the Bottom-Up Approach according to the invention.

FIG. 10 illustrates problems which can occur with bottom-up transformations by showing the transformation of a left-deep join tree which yields a lopsided and unbalanced query tree.

FIG. 11 is a listing of code involved for implementing the Hybrid Approach according to the invention.

DETAILED DESCRIPTION OF THE PREFERRED EMBODIMENT

The present invention involves the basic concept and general approach of improving response time for a left deep join tree using tree transformations. More specifically, a class of basic transformations are developed which are applied in sequence using the novel processes disclosed herein. These transformation techniques, as detailed further below, can also be incorporated into existing query optimizers.

Figure 14:
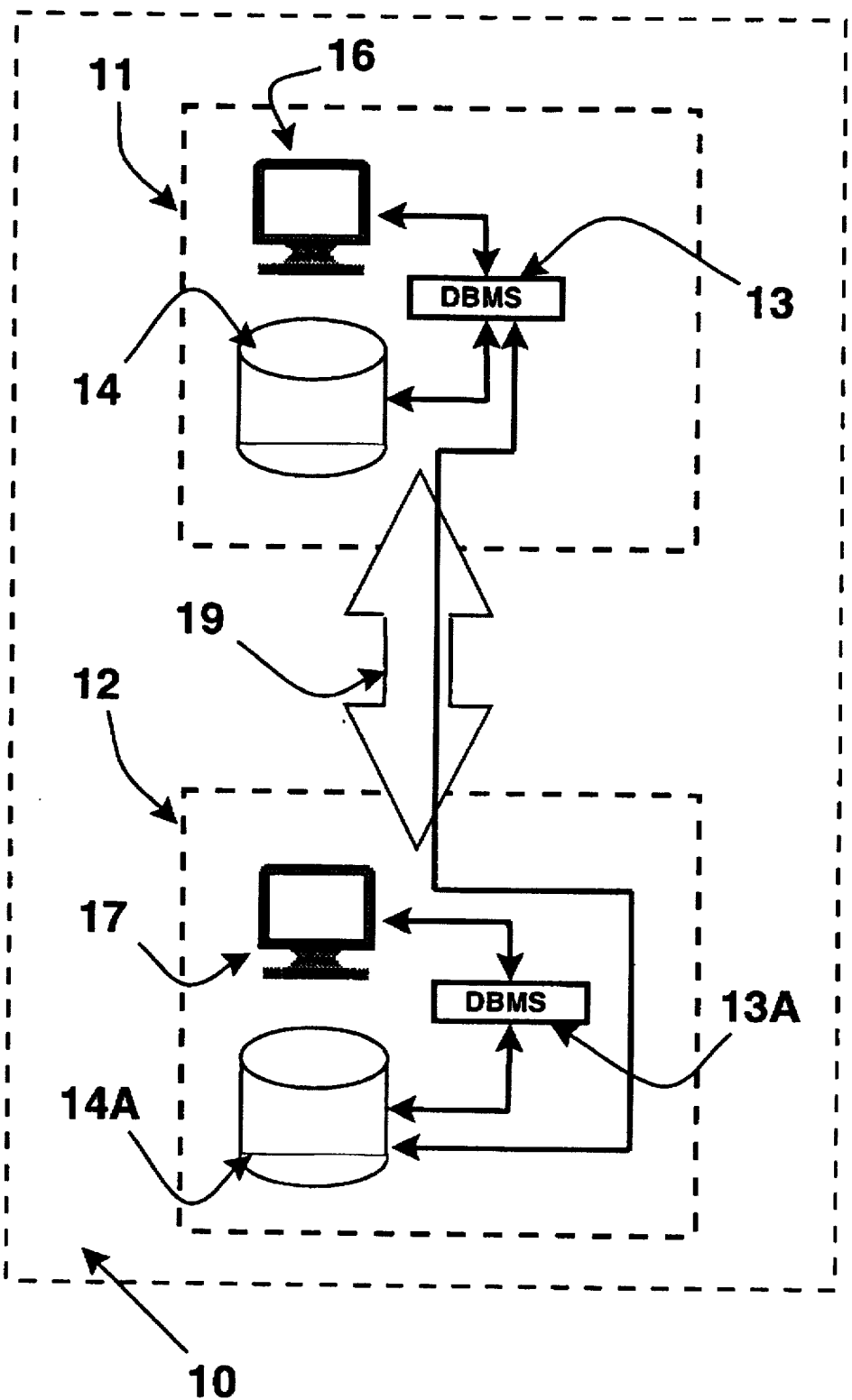
FIG. 14 illustrates a simple multidatabase machine network of two machines interconnected by bidirectional digital data communications channels.

Referring to FIG. 14, a distributed computer database network 10 has a requestor database machine system 11 and one or more database machine systems 12. The configuration represents, for example, a simple distributed banking system with two sites, one in Portland, Oreg. and one in San Francisco, Calif. In the invention either a local area or long haul network will work; for purposes of this discussion, we consider the distributed network over a long haul communication means with machines in separate cities.

Query accesses in this network distributed database system involve a requestor machine system 11 having its local database manager 13 search databases 14 on itself and one or more other machine systems 12, and return a search result to a requestor workstation 16. High speed communications facilities between machines can be implemented through a variety of means 19 from standard 10 megabit per second ethernet local area networking to long-haul data communications facilities which transfer data over great distances at rates of 50 to 100 kilobits per second. The system 10 is considered heterogeneous if the individual local databases are managed by separate and distinct sub-systems called database managers 13, 13A, etc. whose only unifying means is a standard structured query language. The intended result is that the information database, although distributed across multiple machine systems, perhaps geographically dispersed, appears to be one seamless large system. The machine interconnects and separate components, therefore, are transparent.

Figure 15:
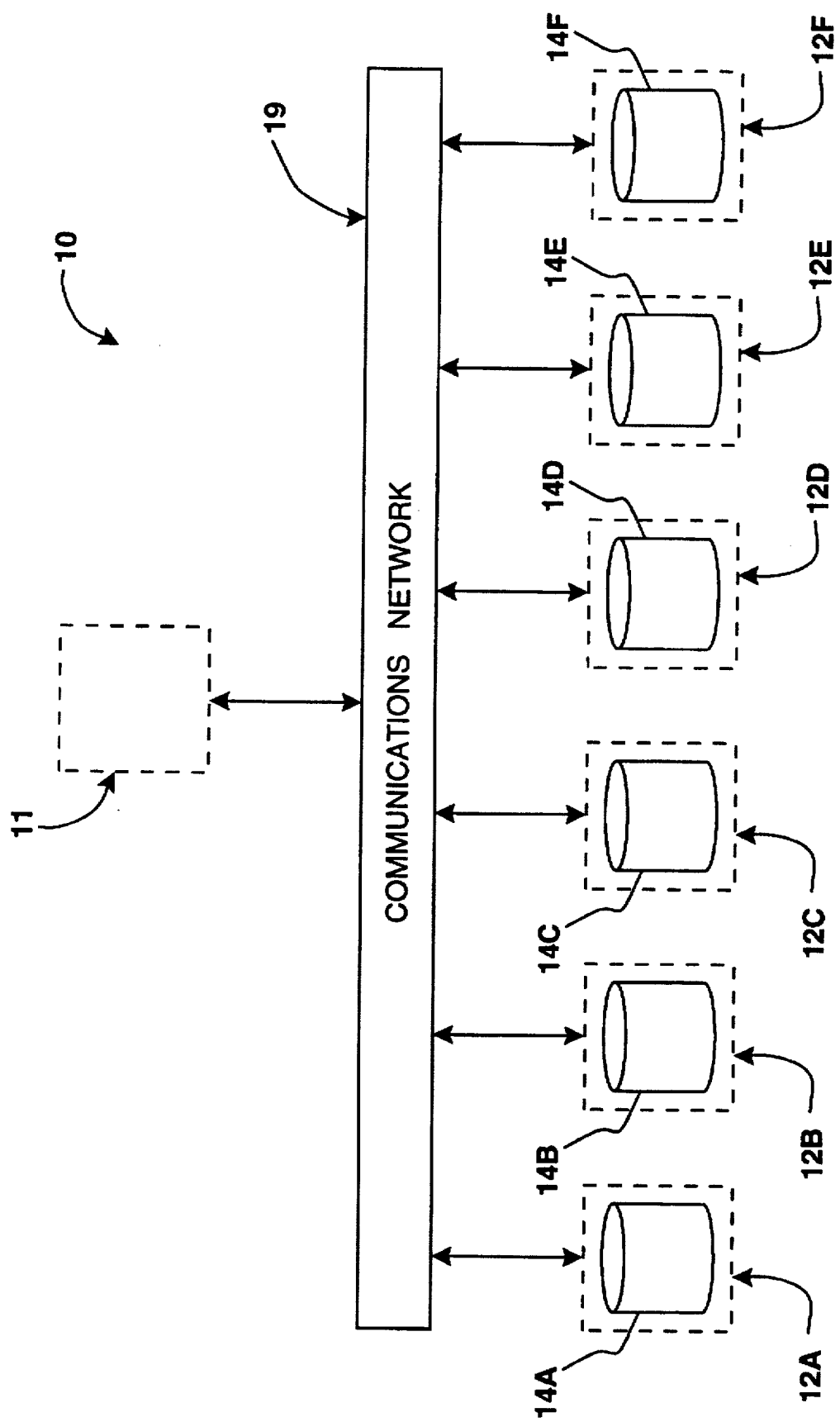
FIG. 15 is a block diagram of a multidatabase system (MDBS) in which the present invention is employed.

The present invention allows this multidatabase system 10 to optimize the CPU cost with respect to database quedes from an unlimited number of participating workstations 17, directed at the overall database as distributed by the architecture. In more complex multidatabases, such as that shown in FIG. 15, optimization of database queries becomes even more important as the number of external databases (EDBs) increases. The multidatabase system 10 shown contains a requestor database machine system 11 hooked into a communications network 19. The network is electronically connected to six other relevant machine systems 12A–12F, each having an external database 14A–14F respectively. Depending upon how the data is distributed within each EDB over the multidatabase network, the query is hierarchically structured to perform subqueries in a certain order with the ultimate goal of minimizing the cost and response time required to retrieve the requested data from the network. Unfortunately, the resulting left deep join tree query structure obtained from traditional optimization strategies yields poor response times within multidatabase systems.

Figure 16:
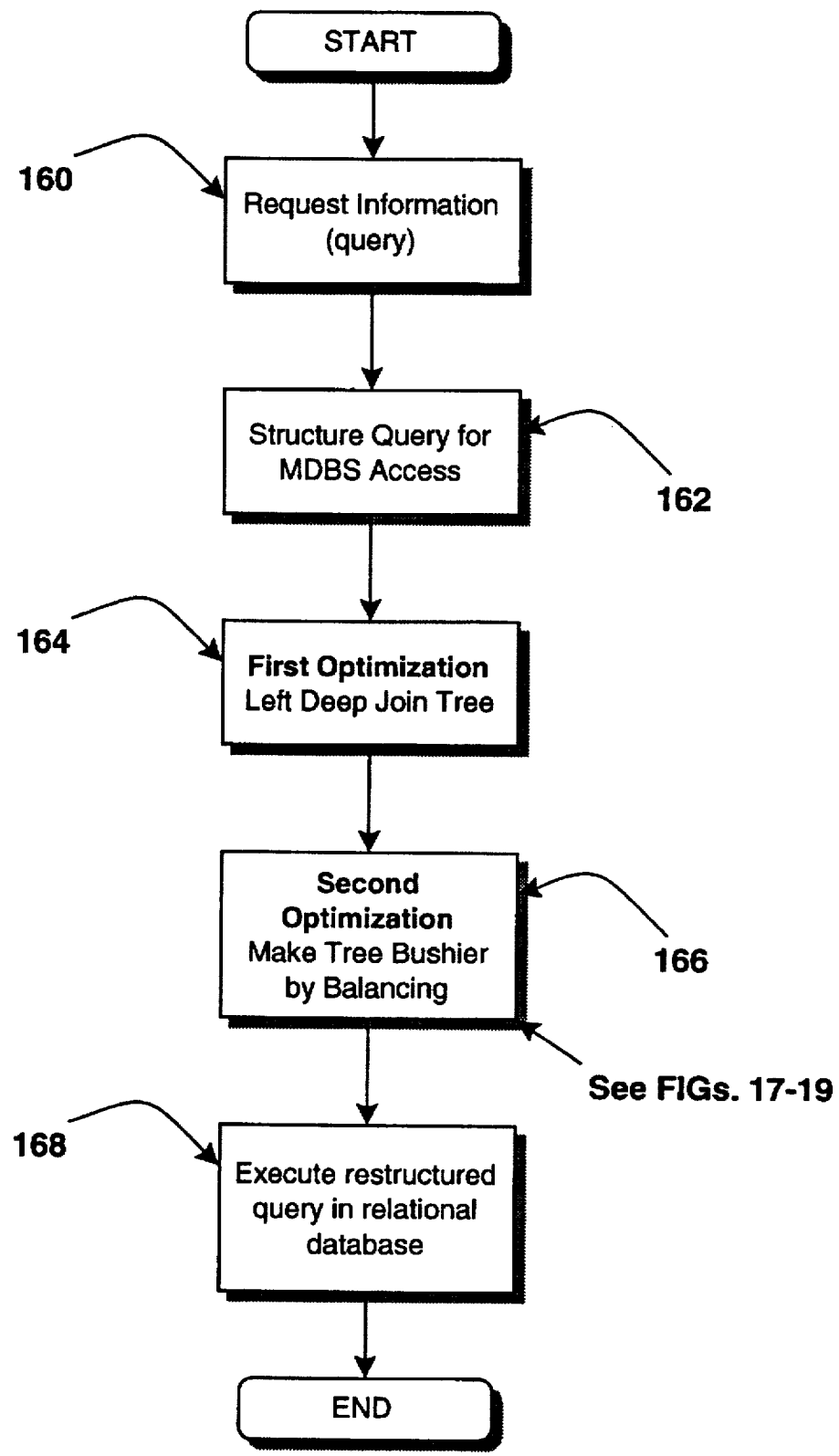
FIG. 16 is a flowchart illustrating the process of optimizing the query tree structure in the execution of a database query according to the present invention.

FIG. 16 shows, in general terms, the novel two phase approach to query tree optimization which is embodied in the present invention. A request for information or query 160 is processed by a normally local database machine system. The query is then structured in step 162 by the database management system to retrieve the requested data. Prior to the compilation of the data, a first optimization step 164 is performed on the structured query. Traditional optimizers (e.g. System-R) yield a left deep join query structure such as that shown in FIG. 1. A second optimization step 166 is then performed on the left deep join query structure to balance the query in order to take advantage of parallel or simultaneous processing of the query joins within the query structure. The preferred transformation methods are discussed further in this specification and include top-down, bottom-up, and hybrid processes. The restructured query is then executed within the global relational database 168.

OVERVIEW OF EXAMPLES

There are two major factors that contribute to the poor response time of left deep join trees: sequential execution of joins and long hierarchical delay of sort merge and hash joins. Since long hierarchical delay is inherent in sort merge and hash joins, the response time can only be improved by balancing left deep join trees so that joins can be executed concurrently. Fortunately, tree balancing is possible as joins are associative. The concept is illustrated by an example using the database query tree of FIG. 1 and the corresponding general transformation and balancing of that tree to yield the database query tree shown in FIG. 2.

Example #1

This example represents a product quality control application in a DBMS that analyses relationships between products, customers and suppliers. In the application, a company has a set of business divisions. Each division makes a number of products. An order is placed by a customer. For every order, the name of the product and the amount are registered. Finally, a product consists of a set of parts. Each part is used by a product and provided by a supplier.

Product(pdid, name, did*)
Division(did, name, city)
Order(pdid,cid, quantity, date)
Customer(cid, name, city)
Part(ptid, name, pdid*, sid*)
Supplier(sid, name, city)

Figure 1:
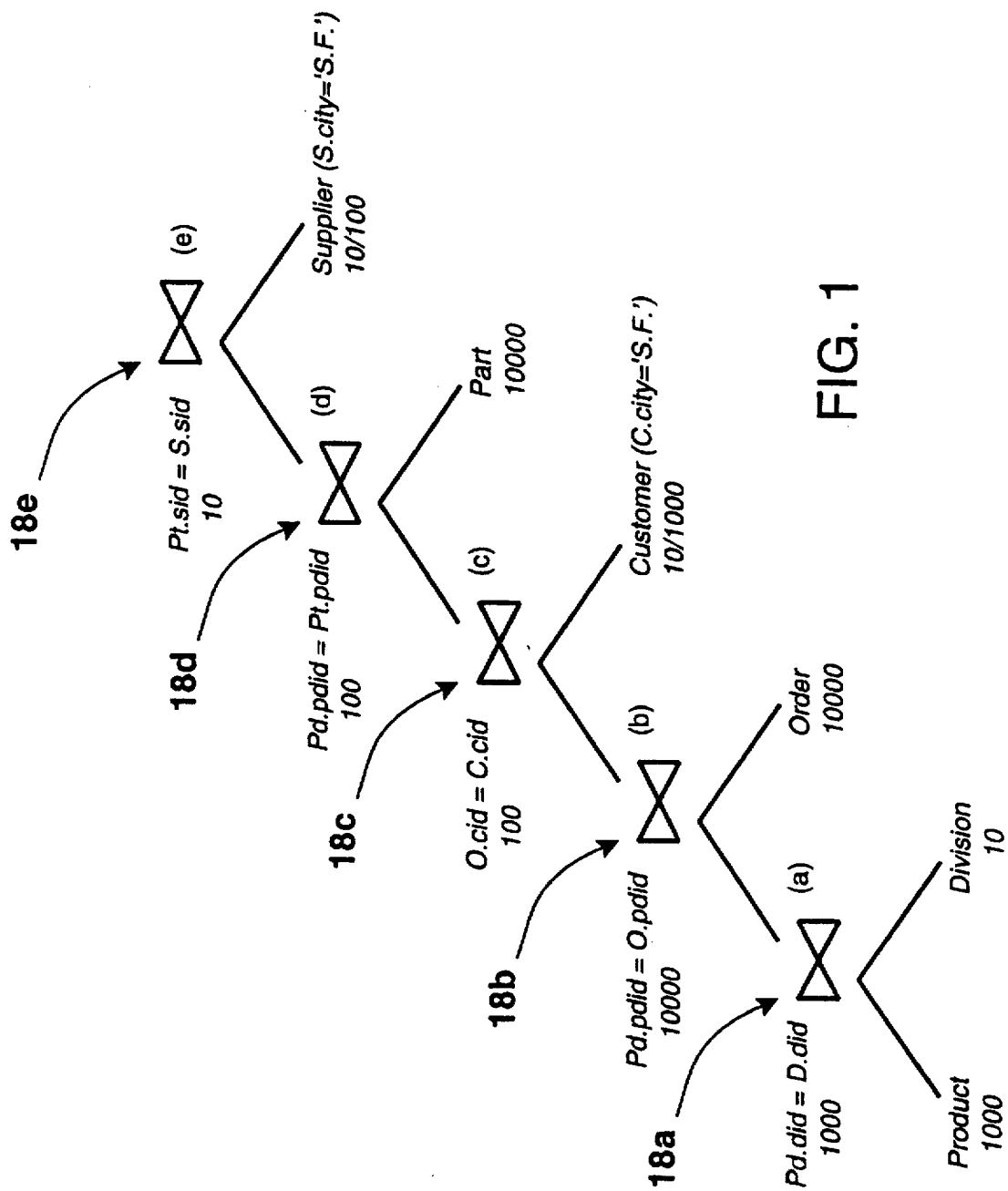
FIG. 1 is a diagram illustrating an example of a query involving tables of products, divisions, orders, customers, parts, and suppliers organized in left-deep join tree form.
Figure 2:
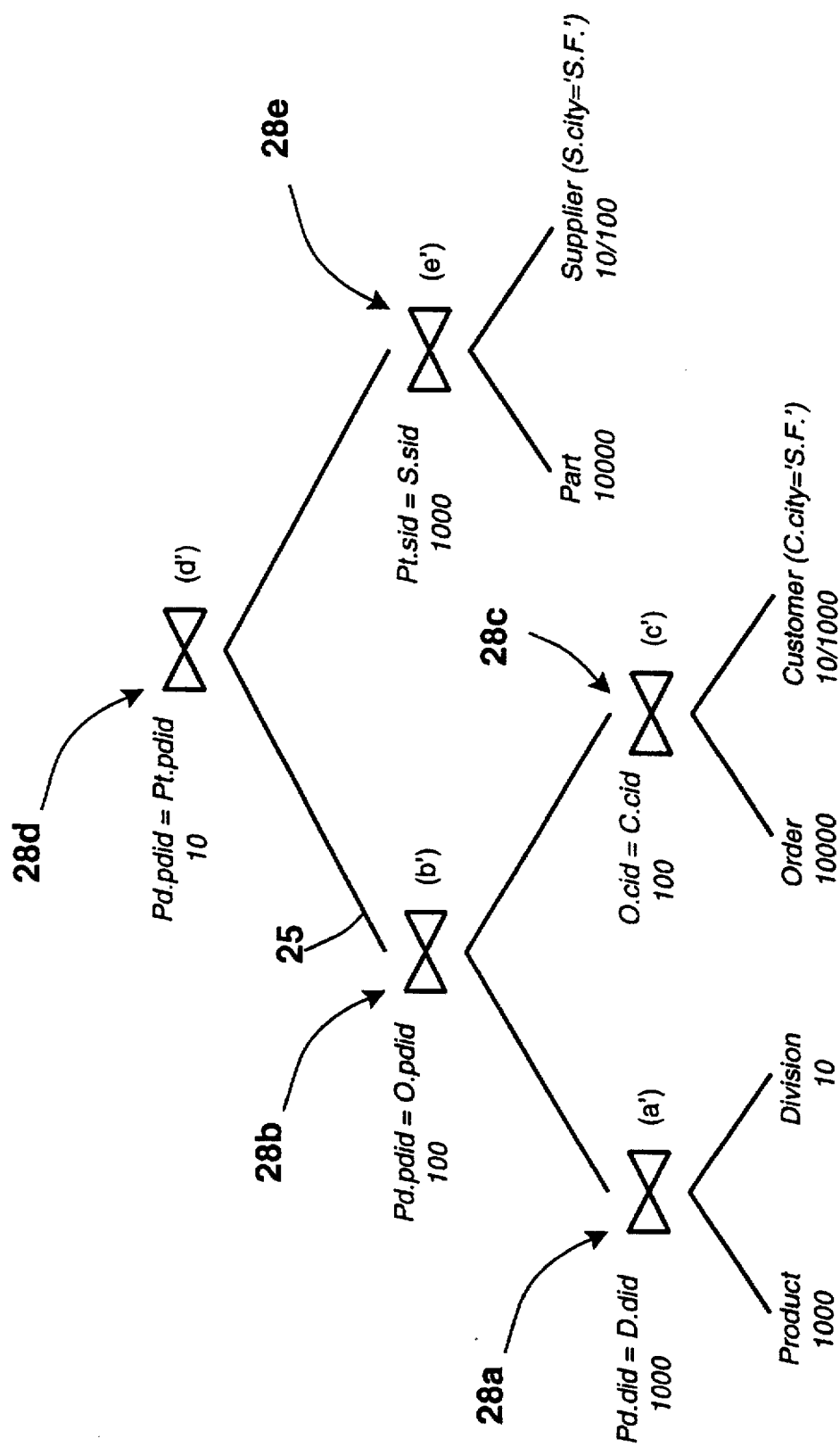
FIG. 2 is another diagram illustrating the same query as in FIG. 1 except organized in balanced join tree form according to the invention.

For the sake of this example, and as is often the case in a MDBS, the six relations are imported to local DBMS 13 from six different external data sources (EDSs) 14A–14F. The following query finds all products that have been sold to customers in San Francisco and that use parts provided by suppliers in San Francisco, and returns the names of the product and the divisions that make them.

select Pd.name, D.name from Product Pd, Division D, Order O, Customer C, Part Pt, Supplier S where C.city= 'S.F.' and S.city='S.F.' and Pd.did=D.did and Pd.pdid= O.pdid and O.cid=C.cid and Pd.pdid=Pt.pdid and Pt.sid=S.sid;

FIG. 1 shows a possible left deep join tree generated by the traditional query optimizer for the query. It is assumed that all joins are implemented using the sort merge join method. FIG. 2 shows a more balanced bushy join tree for the same query. The latter is generally considered to be better, especially with respect to query response time, as joins (i.e., join 28a between Product and Division, join 28c between Order and Customer, and join 28e between Part and Supplier) can be performed concurrently.

It is possible to improve response time without increasing total resource usage. As a matter of fact, both response time and total resource usage could be improved by tree balancing, even if the original left deep join tree is already optimal with respect to total resource usage. This is the case because bushy join trees were not considered by the original optimizer.

To see this, first consider the join tree in FIG. 1. Suppose that the company makes 1000 products, uses parts provided by 100 suppliers, and sells products to 1000 customers. For the sake of simplicity, assume that each supplier provides 100 parts, each product consists of 10 parts, each customer places 10 orders, and each order consists of 10 products. Therefore, 1000 customers place a total of 10000 orders and 100 suppliers provide a total of 10000 parts. It is assumed that 10 out of 100 suppliers and 10 out of 1000 customers are from San Francisco.

Joins 28a and 28c in FIG. 2 have the same costs as joins 18a and 18c in FIG. 1. However, the cost of join 28b is much smaller than that of join 18b, as the size of join 28c is much smaller than that of table Order. Communication costs are also reduced in the balanced join tree. For example, to perform join 18b in FIG. 1, we need to ship 1000 tuples (result of join 18a) to the site where Order resides. In FIG. 2, however, we only need to ship 100 tuples (result of join 28c) to the site where result of join 18a resides. Therefore, the total cost of evaluating the subtree rooted by join 18c in FIG. 1 can be significantly reduced by transforming it into a more balanced bushy tree which allows join 28a between Product and Division and join 28c between Order and Customer to be performed concurrently.

It should also be noted that not all transformations will improve query response time and total resource usage. In FIG. 2, for example, the other transformation that allows join 28e between Part and Supplier to be performed concurrently may increase total resource usage if the predicate on Supplier was (S.city!='S.F.'). Join 28e between Part and Supplier in FIG. 2 is expensive as Part is much bigger than join 18d. Therefore, transformations cannot be blindly applied. Rather, according to the invention they should be applied in a cost-based manner.

Balancing Left Deep Join Trees

Transforming a left deep join tree into a more balanced bushy join tree is not easy, due to the large number of possible bushy join trees. For a left deep join tree of n joins, there are $(1/n+1)(n2n)$ equivalent bushy join trees. Clearly, such a big transformation space is not desired. A feasible approach is to apply a sequence of basic transformations which can be easily identified and performed. In general, any complex transformation from a left deep join tree to an equivalent bushy join tree can be decomposed into a sequence of well defined basic transformations. For example, the transformation from the query tree in FIG. 1 to the query tree in FIG. 2 can be decomposed into two simpler ones. The first involves Order and Customer, and the other involves Part and Supplier.

For a given query tree, there are usually several possible transformations that might improve the response time. For a given transformation, there can also be many different ways of decomposing it into basic transformations. Different transformations can result in query trees of different response time and different decompositions can incur different overhead. As in the traditional optimization problem, the difference can be very large. Therefore, defining basic transformations and devising methods to control the application of basic transformations are two important issues in balancing left deep join tree using tree transformation.

Basic Transformation

Generally, the data structure within a database includes nodes which are associated with certain data and further are indicative of the cost to evaluate the node. Each node has a pointer 25 which links the node to others within the data structure. When a database is queried, the optimizer structures the queries in tree form to maximize efficient retrieval of data within the data structure. The query tree structure includes a plurality of join nodes which link two data tables within the query tree structure thus producing child subtrees dependant from the particular node.

A basic transformation takes as input a tree segment (termed as input segment) from the join tree to be transformed. An input segment is identified by two anchor nodes termed as upper anchor node (UAN) and lower anchor node (LAN), respectively. The LAN of an input segment is a left descendant of the corresponding UAN. Left descendants of an internal node are recursively defined. For instance, the left child node of a node is its left descendant. In fact, the left child node of any left descendant of a node is also a left descendant of the node.

Figure 3B:
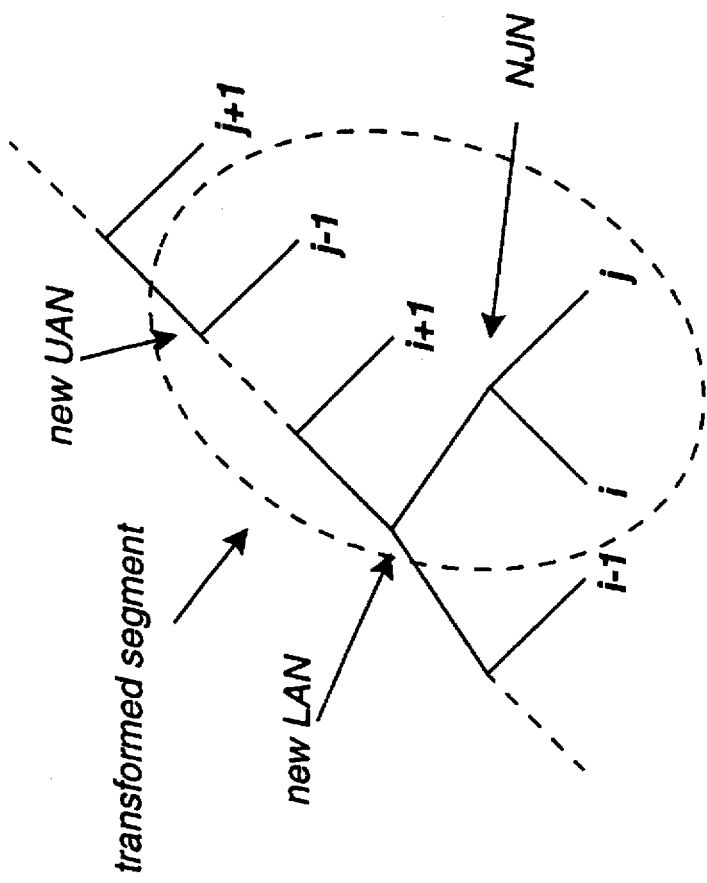
FIG. 3B illustrates the resulting form of the generic join tree segment from FIG. 3A after application of the basic transformation to make the segment more bushy.
Figure 3A:
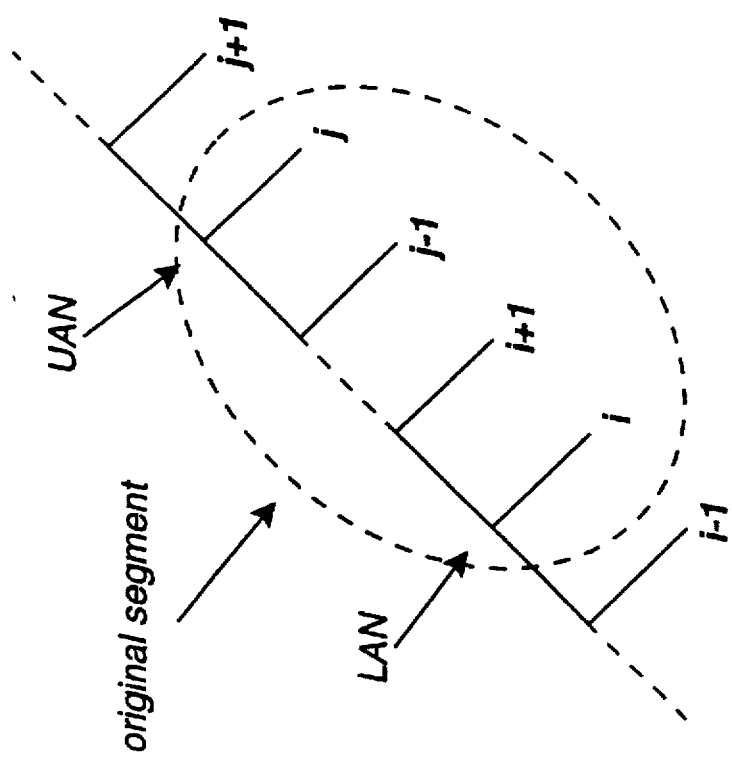
FIG. 3A is a simplified diagram illustrating a segment of a generic join tree to which a basic transformation is about to be applied.

The basic transformation replaces the input segment with the transformed segment which is similar to the input one except that (1) the left child node of the input UAN becomes the new UAN of the transformed segment, and (2) the LAN remains unchanged but the right child node of the new LAN is now a new join node (NJN) of two subtrees which were the right child subtrees of the input UAN and LAN. FIG. 3 illustrates the relationships between the input and transformed segments.

For example, the transformation from the left deep join tree in FIG. 1 to the bushy join tree in FIG. 2 consists of two basic transformations. The input segment of one basic transformation is identified by join 18e as the UAN and join 18d as the LAN, while the other is identified by join 18c as the UAN and join 18b as the LAN. In this particular example, the new UANs and their corresponding LANs are happened to be the same for each transformed segment: join 28d for the former and join 28b for the latter.

For a given query tree, there are many possible applicable basic transformations. Only those transformations which are both valid and cost improving are of interest. A basic transformation is valid if it preserves the semantics of the original query tree. In other words, the transformed query tree should evaluate the same query as the original one. A transformation is invalid if it causes a join node to have insufficient or improperly ordered input data. In FIG. 1, for example, join 18b depends on tables Product and Order. Any transformation that moves Product or Order above the join node is invalid.

Clearly, a basic transformation does not cause insufficient input data to any joins, as it moves UAN's right child subtree down. Joins between UAN and LAN (e.g., joins i+1, ..., and j−1 in FIG. 3) that may depend on input from LAN can still be properly computed. A basic transformation might result in an improperly ordered intermediate result. More specifically, the order of the NJN result can be different from that of LAN's original right child node, and the resulting order of the new UAN can be different from that of the input UAN. The former is possible as the LAN's right child subtree has been replaced with the NJN, and the latter is possible as the input UAN has been moved. Sort nodes may be needed in the two places to put the results into the original orders. With properly added sort nodes, the new UAN produces exactly the same data as the input UAN.

A basic transformation is cost improving if the response time of the transformed join tree is smaller than that of the original join tree and the total cost of the transformed join tree is not greater than that of the original join tree. A transformation might or might not be cost improving, a decision that can only be judged based on cost estimation. In cases where sort operations have been introduced as the result of transformation, costs of sort should also be included in the cost of transformed join tree. Most of the cost information of the original join tree can be reused, except for the NJN and those join nodes between the UAN and LAN. Since the size of the segment is usually small in the present inventive method, the overhead should not be significant. The costs of the ancestor nodes of the UAN can be derived efficiently from the old ones by simply subtracting the cost difference between the original and the transformed UANs. Costs of all other nodes are unchanged in the transformation.

Basic transformations are desired for two major reasons: they are easy to implement and they improve query response time. There are two aspects of easy implementation. First, basic transformations are easy to identify. For a given UAN, the corresponding LAN is selected by examining its left descendants only. Second, they are easy to perform, as a basic transformation affects only a small portion of the join tree (i.e., join nodes between UAN and LAN). Since the transformation preserves the result of the input segment (with proper sort nodes), all other nodes are not affected, except for execution costs of UAN's ancestors.

The primary use of a basic transformation is to balance left deep join trees. It does so by converting n sequentially executed joins (between and including the UAN and LAN) into n−1 sequential joins (between and including new UAN and LAN) and a new join concurrent to the left child subtree of the LAN. The assumption is that for a mostly left deep join tree, the right child subtrees of UAN and LAN are usually smaller than LAN's left child subtree. By combining UAN's right child subtree and LAN's right child subtree, the original join tree is balanced (especially for the LAN). The query response time may be improved as the number of sequentially executed joins between UAN and LAN has been decreased.

Figure 20:
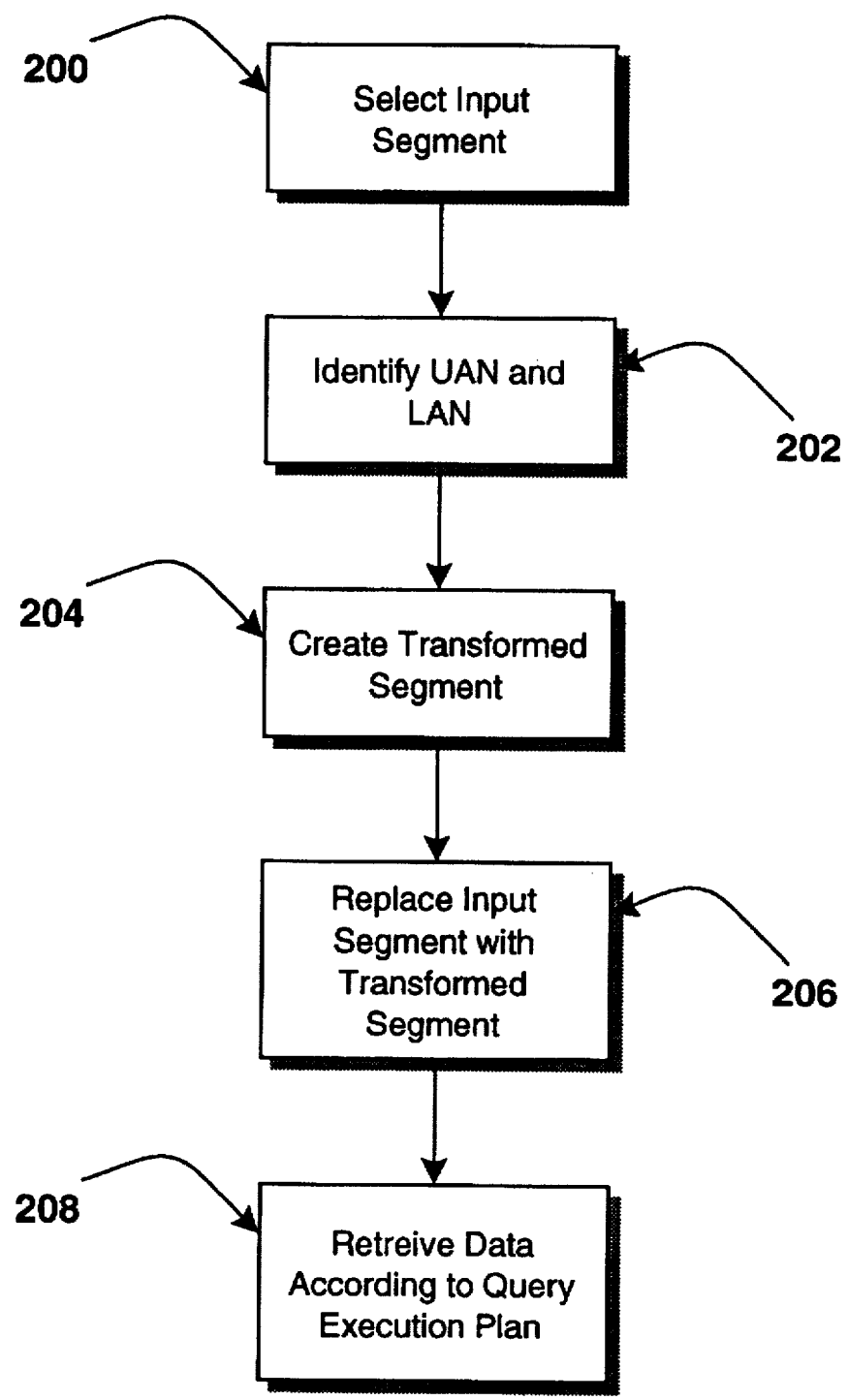
FIG. 20 is a flowchart illustrating the process of implementing a general query tree transformation according to the invention.

FIG. 20 shows a flowchart illustration of the general steps involved in a basic transformation in a multidatabase system (MDBS) for accessing data in a stored relational computer database in response to a database query. The method of structuring a database query tree to reduce query response time using a two phase optimization comprises selecting 200 an input segment from a join tree to be transformed. Next, an upper anchor node (UAN) and a lower anchor node (LAN) are identified 202, wherein the LAN is a left descendant of the UAN. A transformed segment is created from the input segment in step 204 wherein the transformed segment is identical to the input segment except that the left child node of the input UAN becomes the new UAN of the transformed segment and the LAN remains unchanged. The right child node of the new LAN is now a new join node (NJN) of the two subtrees which were the right child subtrees of the input UAN and LAN. In step 206 the input segment is replaced with the transformed segment and data is retrieved 208 from the database responsive to the database query in accordance with a query execution plan operating according to the bushier tree structure.

Identifying Basic Transformation

As explained earlier, a basic transformation is uniquely identified by the UAN and LAN. The process of balancing a left deep join tree is therefore a process of repeatedly selecting UANs and LANs and applying the basic transformations. The previous subsection showed how a basic transformation is applied to an unbalanced join tree. The selection process of a LAN for a given UAN will be discussed now. Selecting the proper UANs will be discussed later.

There are two basic criteria in selecting LANs: the procedure should be simple, and the resulting NJN should be balanced. The two criteria, however, are somewhat contradictory. Simplicity implies selecting LAN that are close to the UAN, while balance implies selecting LAN whose right child node is closest (in terms of response time) to that of UAN's right child subtree. A practical solution is to select the closest node whose right child subtree's response time is within a certain range (relative to that of the UAN's right child subtree).

In the above described scheme, nodes under the UAN will be skipped if their response times are out of the pre-specified range. This could cause problem as the following example shows. FIG. 4B shows a join tree of four tables: 40A, 40B, 40C, and 40D. The cost of each table and the response time of each join node are shown in the FIGURE. It is assumed that each join takes 5 units of work. Suppose the root is the current UAN, FIG. 4A shows the result of the basic transformation as selected by the above process with range 12±5. Table 40C is not selected because its response time is out of the range. Suppose there is a join predicate between tables 40C and 40D, but no join predicate between tables 40A and 40C. Although the NJN subtree of the previous transformation is balanced, the overall join tree is not balanced and cannot be further balanced, as the cross product of tables 40A and 40C is very expensive. The problem can be fixed by extending the process to skip only those join tables that have join predicates with other join tables (e.g., 40A). FIG. 4C shows a more balanced join tree produced by the basic transformation that is selected by the extended process.

In the following discussion, only the basic transformations that are both valid and cost improving are considered. They will simply be referred to as basic transformations. The existence of the following two functions are also considered: Find-LAN(U) and Transform(U, L). Given an UAN U, the first function returns L as the LAN using the above process (or null if no such node can be found), and the other applies the basic transformation identified by U and L to the subtree rooted by U. The left child node of U becomes the new UAN after the transformation.

Transformation Processes

The present invention provides three novel tree traversing processes that govern the selection of UANs. The first method (top-down approach) traverses a join tree from the root to leaves, while the second (bottom-up approach) does it from leaves to the root. Brief analyses follow showing strengths and weaknesses of each approach. A hybrid approach is then proposed which overcomes these weaknesses.

Top-Down Approach

The intuition behind the top-down approach is that a join tree can be balanced by evenly distributing load of each internal join node between its two child nodes. The code, shown in FIG. 5, outlines the top-down approach, where N is the current UAN. This embodiment of the process assumes the existence of the following simple functions whose semantics are straightforward: left-child(), right-child (), leaf(), response-time().

In the balancing method, the root of the original left deep join tree serves as the initial UAN. For each UAN, there are three cases. The first case is characterized by a leaf left child node. The process simply terminates as the load of the UAN cannot be redistributed and all other join nodes (which are ancestors of the current UAN) have already been processed.

The second case is when the response time of the right child subtree is about the same as or greater than that of the left child subtree. In other words, the load of the UAN has already been distributed between its two child subtrees as evenly as possible. Although no transformation is necessary for the UAN, the two child subtrees may still be unbalanced. Recursive invocations of the method on both child subtrees are therefore performed.

A transformation is needed only in the last case when the response time of the left child subtree is greater than that of the right child subtree. If there exists such a basic transformation, it will be performed. UAN's left child node becomes the new UAN after the transformation. If no transformations could be found for the current UAN, the method will first balance the left child subtree as it dominates the overall response time. The right child subtree will also be balanced if it dominates the overall response time after the left child subtree has been balanced.

Example #2

FIGS. 6A–6F show an example of tree balancing using the top-down approach, where the input segment (indicated within the dashed lines) and therefore the UANs and LANs are highlighted at each step. For the sake of simplicity, we assume that the eight join tables are about the same size. We further assume that there exists a join predicate between each pair of join tables. At the beginning, the left child node of the root is much larger than the right one. Therefore, the root is selected as the UAN and the parent of table 60G is selected as the LAN (FIG. 6A. The transformation has the "effect" of moving table 60G from the left child subtree into the right child subtree (FIG. 6B. The process continues until both child subtrees are left deep join trees of four tables (FIG. 6D. Although the load of the new root is evenly distributed, the overall join tree is not balanced, as both its child subtree are still left deep trees. Further balancing on each of the two child subtrees is performed (FIG. 6D and FIG. 6E and the final join tree is shown in FIG. 6F.

Figure 17:
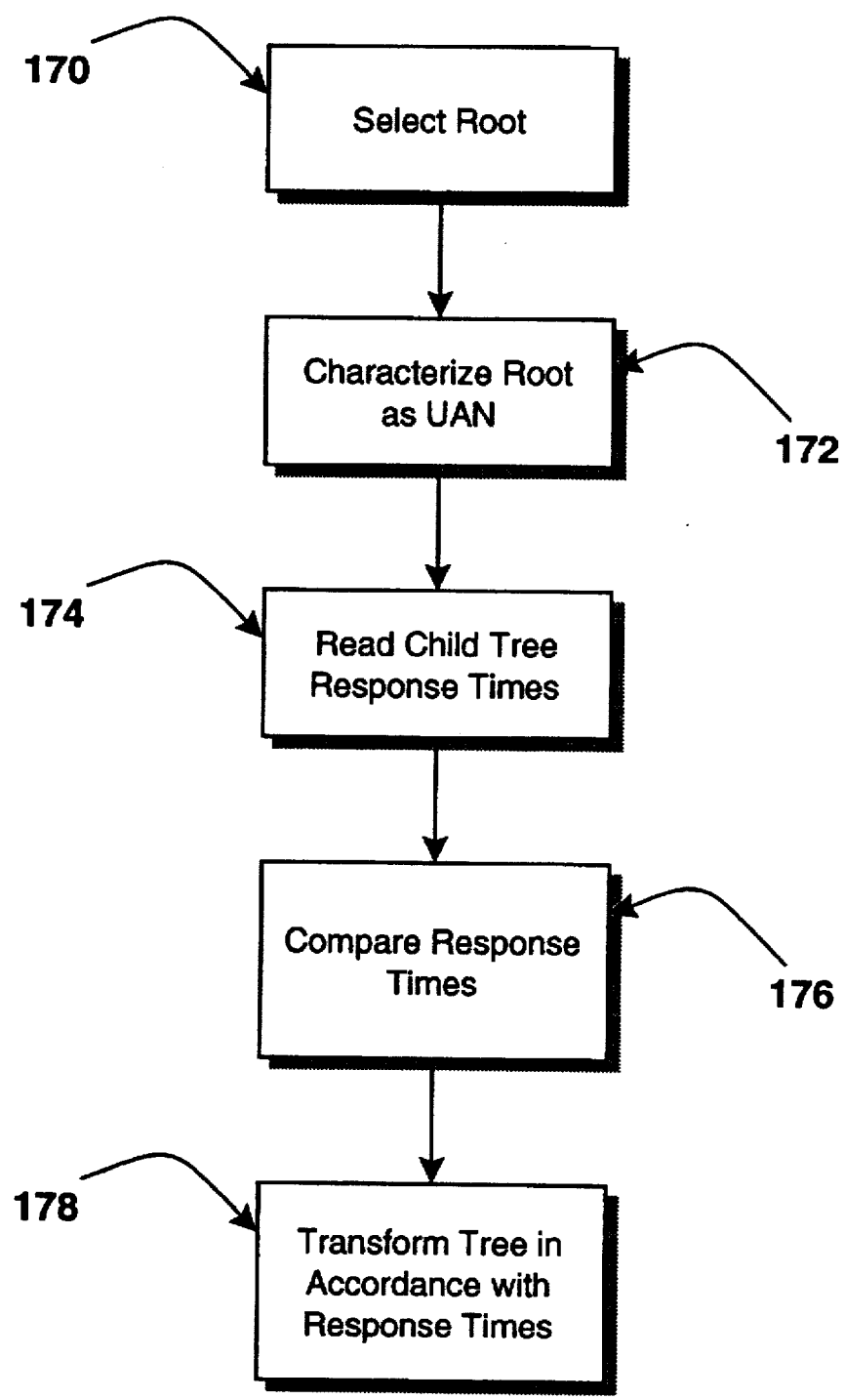
FIG. 17 is a flowchart illustrating the process of implementing the Top-Down Approach according to the invention.

FIG. 17 illustrates, in flowchart form, the basic steps performed within the top-down approach. The database query optimization system first selects a root node of the left deep join tree having a corresponding right child subtree and a left child subtree, each with a corresponding cost in step 170. The root node is then characterized as an upper anchor node (UAN) in step 172 wherein the response times of the corresponding right and left child subtrees are read 174. The optimization process the compares 176 the corresponding right child tree response time with the corresponding left child tree response time, and transforms 178 the left child node into a new root of the transformed tree if the cost of the left child subtree is greater than that of the right child subtree.

Discussion

There are two major issues in balancing left deep join trees: the quality of the resulting bushy join trees and the overhead it incurs. The former can be measured by the improvement in the response time, while the latter can be measured by the number of basic transformations it invokes. These two issues will now be discussed in the context of a top-down process.

The overhead incurred by the top-down approach is minimal, especially compared to that of an exhaustive search method. It can be shown that for any given left deep join tree of n joins, the top-down approach performs at most $\frac{1}{2}(n-1)(n-2)$ basic transformations. The following is an informal proof.

The top-down transformation consists of several steps: one for each (recursive) invocation of the process. The first step balances the root node by redistributing loads between its two child subtrees. The second step balances the two child nodes of the root, and so on. In the worst case (when the leftmost leaf node dominates the total cost), the first step requires $(n-1)$ basic transformations and results in a join tree whose left child subtree contains only one node: the original leftmost leaf node, and whose right child subtree contains all other nodes. Similarly, the second step requires $(n-2)$ basic transformations in the worst case where one child subtree is a left deep join tree of $(n-1)$ joins and whose leftmost leaf node dominates the total cost. Therefore, to fully balance the join tree, $(n-1)+(n-2)+\ldots+2+1=\frac{1}{2}(n-1)(n-2)$ basic transformations are required.

In the general case where the loads of leaf nodes are similar, a left deep join tree can be transformed into a balanced bushy join tree in about $O(n \log n)$ basic transformations. This is the case as log n steps are needed, and at each step, n basic transformations are needed to balance the join nodes at the level.

Unfortunately, the top-down approach does not guarantee that the resulting join tree is optimal with respect to response time. It only improves the response time of a given left deep join tree. One problem with the top-down approach is that it balances a node before its child nodes are balanced. Therefore, a node is balanced based on the response times of its unbalanced child subtrees. However, two subtrees of the same response times may have different response times after being balanced. FIGS. 7A–7C show such an example, where FIG. 7A is the original left deep join tree. In the example, each table node is labeled with its cost and each join node is labeled with the response time of the subtree rooted by the node. It is assumed that each join requires 5 units of work (including sorting the join result). FIG. 7B shows the result of the first step of the transformation (i.e., the load of the root has been evenly distributed). In this example, the left child subtree can be further balanced, while the right child subtree cannot. FIG. 7C shows the final bushy join tree which is not perfectly balanced. However, a more balanced join tree is obtained when the hybrid process described in detail later is applied.

Bottom-Up Approach

In contrast to the top-down approach, the bottom-up approach balances UANs after their child subtrees have been balanced. The code shown in FIG. 8 outlines the bottom-up approach. A left deep join tree can be balanced by calling Bottom-Up(N), where N is the root of the join tree.

Since the right child nodes are initially leaf nodes in left deep join trees, the method first recursively balances the left child subtree. The process stops when the UAN is the parent of the leftmost leaf node. The method returns to the parent of the current UAN either immediately if there exists no valid and cost improving basic transformation for the node or after each transformation if there exists one. Therefore, the UAN moves from the parent of the leftmost leaf node to the root of the original join tree.

At each UAN, if a transformation can be identified to improve the overall query response time, it will be performed. The transformation has the effect of adding the right child subtree into the (already balanced) left child subtree, resulting in a bigger balanced subtree.

It is possible that the NJN is not balanced after the transformation, as it is formed by joining the right child subtrees of UAN and LAN. UAN's right child subtree is always a leaf node but LAN's right child subtree can be an arbitrarily complicated subtree. Further balancing on the NJN might be necessary. Of course, the balancing is necessary only if the NJN dominates the response time of its parent node.

If no valid and cost improving transformation can be found at the current UAN, the method usually returns. There are, however, cases where transformations are desired even if they do not improve the overall query response time. The transformation can be justified if the LAN is not well balanced. The idea is that the overall response time could be improved later by further balancing the NJN. Note that the non-cost improving transformation is always followed by an attempt to further balance the NJN. This is the case as the NJN always dominates the cost of its parent node after each such transformations.

Example #3

Figure 9:
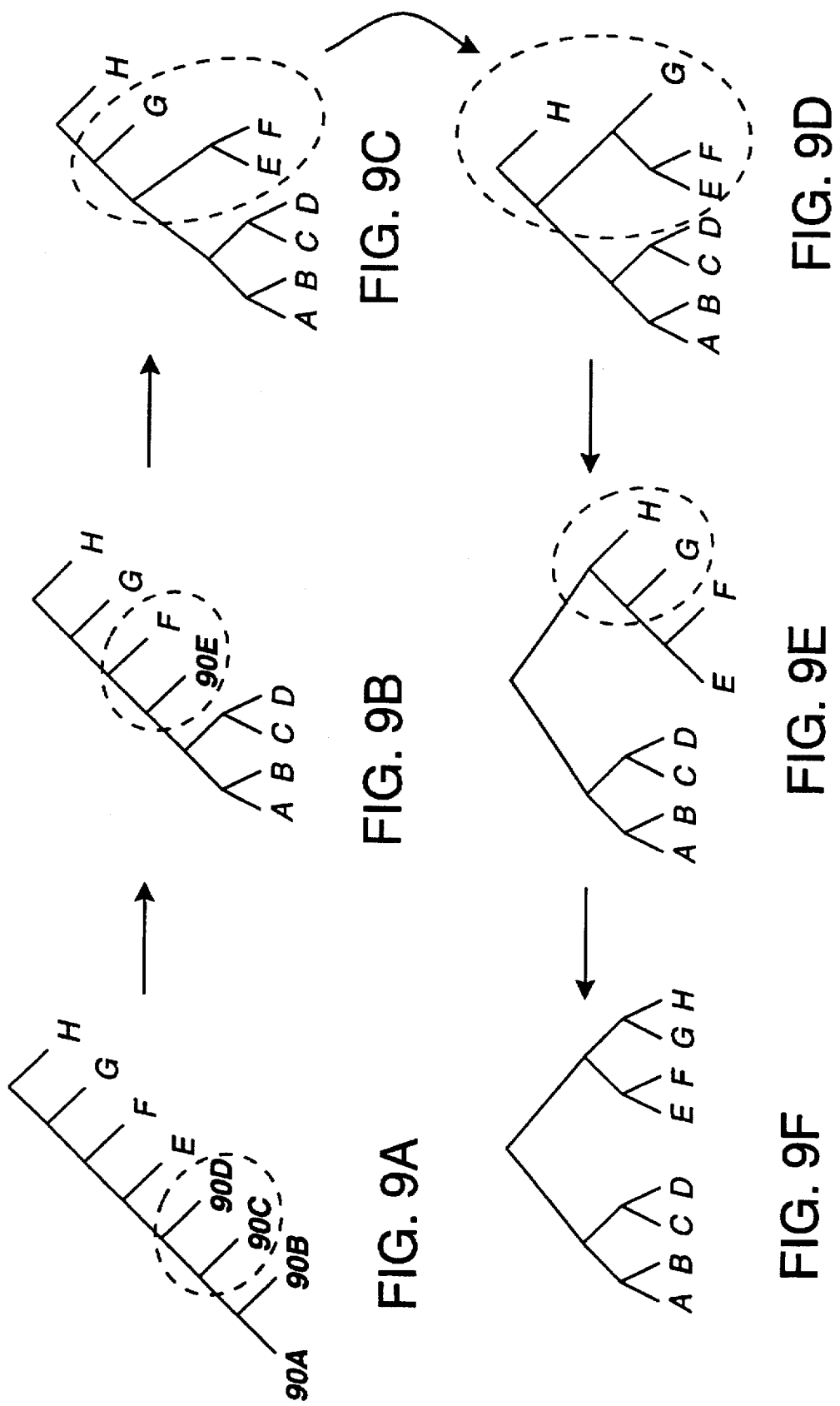
FIGS. 9A–9F show an example of the five step bottom-up transformation shown in FIG. 8 as applied to the generic left deep join tree shown in FIGS. 6A and 9A, showing intermediate FIGS. 9B–9E, and yielding the balanced bushy tree shown in FIG. 9F.

FIGS. 9A–9F show the bottom-up transformation that balances the same left deep join tree as in FIG. 6A. Again, the input segment which undergoes transformation is indicated within the dashed lines. The process starts from the root of the original query tree. The UAN moves down from the root to the parent of nodes 90A and 90B, as the method recursively invokes itself to balance the left child subtrees. Since both nodes 90A and 90B are leaf nodes, their parent node cannot be further balanced. The method therefore returns and the parent of node 90C becomes the UAN. Although the UAN's left child subtree is more heavily loaded than the right child subtree, no basic transformation can be found to either improve the response time or further balance the LAN. The first cost improving basic transformation is found when the parent of node 90D becomes the UAN (FIG. 9A). 90C's parent node and node 90D serve as the LAN and UAN, respectively, in the transformation. The transformation has the effect of adding the UAN's right child node (node 90D) into UAN's left child subtree, resulting in a new balanced subtree (containing nodes 90A, 90B, 90C and 90D). The parent of node 90E becomes the new UAN after the method returns. Clearly, there exists no cost improving transformation. In addition, all possible LAN candidates are already perfectly balanced. Therefore, no transformation will be performed. The process continues until the root becomes the current UAN (FIG. 9D). Note that the transformation from FIG. 9D to FIG. 9E does not actually improve the overall query response time. The transformation is nevertheless performed, because the LAN is not balanced. In this particular example, the NJN of the transformation can be further balanced which results in a better join tree (FIG. 9(f)).

Figure 18:
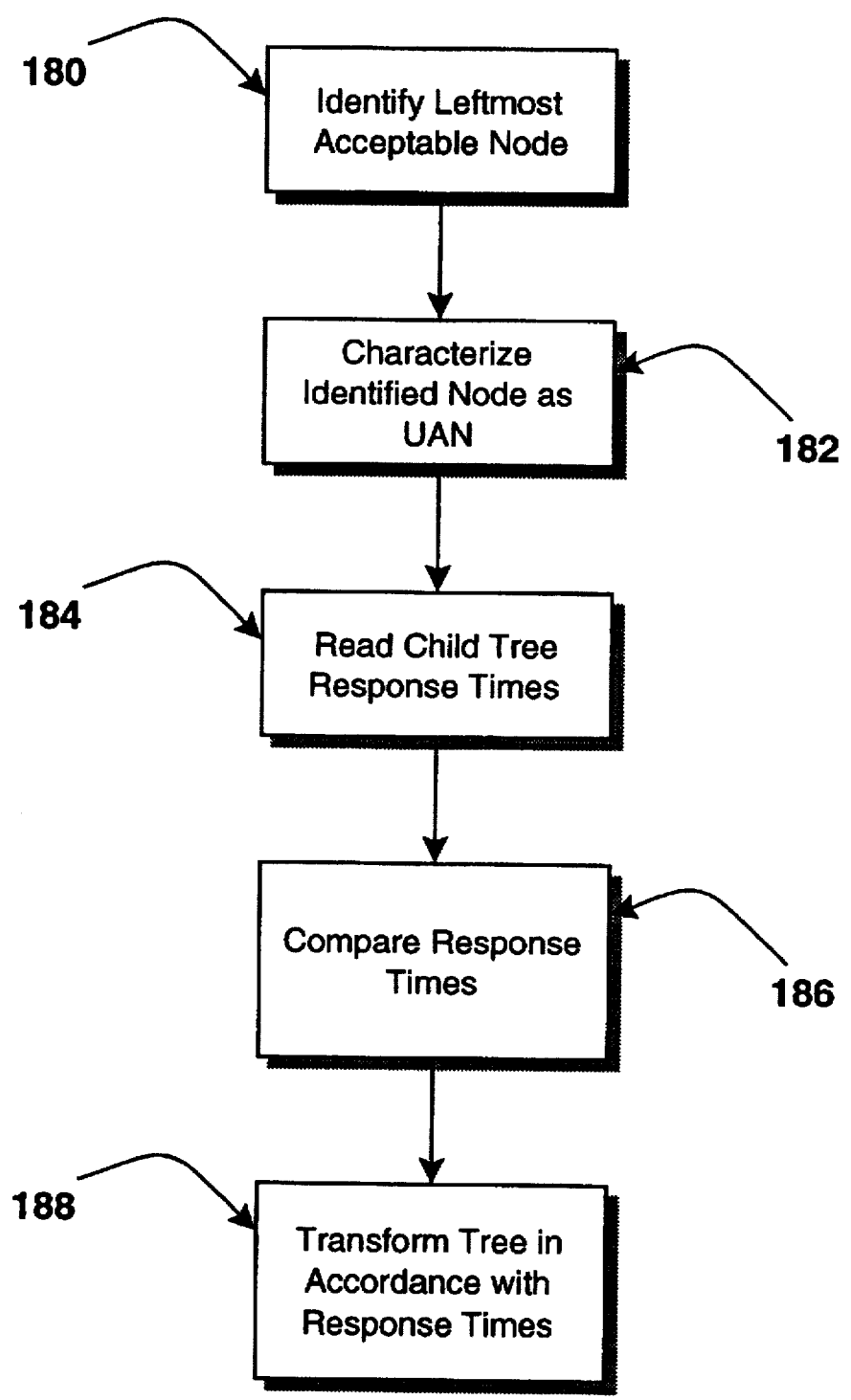
FIG. 18 is a flowchart illustrating the process of implementing the Bottom-Up Approach according to the invention.

FIG. 18 illustrates, in flowchart form, the basic steps performed within the bottom-up approach. The database query optimization system first identifies 180 the lowest leftmost node on a query tree wherein the node's left child subtree and right child subtree are not both single table nodes and the cost of the node's left child subtree is greater than the cost of the query's right child subtree. The identified node is characterized 182 as an upper anchor node (UAN). Step 184 then compares the right child tree response time with the left child tree response time, and, comparing 186 them, transforms 188 the query tree so that the identified node becomes the new child of the left child node.

Please note that, although the top-down and bottom-up approaches result in the same bushy join tree, they invoke different basic transformations. In general, the two approaches result in different bushy trees.

Discussion

The bottom-up approach works by adding the right child subtree of the UAN into the (already balanced) left child subtree and always results in a bigger balanced subtree after the transformation. Since it starts from bottom, it lacks of the global view of the join tree. It is therefore possible that a subtree is perfectly balanced but the overall query tree is not, as shown in FIG. 10. This can be clearly seen as the root 108 of the transformed tree has a much larger left child subtree 104 than right child subtree 106. Thus, the top-down approach is clearly superior in this case.

Similar to the top-down approach, the upper bound complexity of the bottom-up approach is $\frac{1}{2}(n-1)(n-2)$ and the complexity for the general case is $O(n \log n)$. Again, the bottom-up transformation of an n-join left deep tree is decomposed into $(n-1)$ steps: one for each join node except the lowest level join node. In the first step where the UAN is the grandparent of the leftmost leaf node, at most one basic transformation is needed. The next step, however, may require two basic transformations, as the NJN may not be balanced and need an additional basic transformation. In general, i basic transformations may be needed at the i-th step: one for regular transformation and i-1 for recursive balancing of the NJN subtree which could be an unbalanced join tree of depth i-1. Therefore, the whole process requires at most $1+2+\ldots+(n-2)+(n-1)=\frac{1}{2}(n-1)(n-2)$ basic transformations.

Also similar to top-down approach, $O(n \log n)$ basic transformations are needed in the general case where cost of leaf nodes are about the same. This is the case as balancing of the new join node (NJN) at each step requires about log n basic transformations.

Hybrid Approach

As previously shown, both top-down and bottom-up approaches individually have some weaknesses. The method shown in FIG. 11 outlines a hybrid approach which combines the top-down and bottom-up approaches to overcome these weaknesses. A left deep join tree with root N can be balanced by invoking Hybrid(parent(leftmost-leaf(N)), N). This method assumes the existence of the following simple functions whose semantics are straightforward: left-child(), right-child(), response-time(), parent(), and leftmost-leaf().

In the hybrid approach, two sequences of transformations happen concurrently: one starts from the root following top-down protocol, and the other starts from the leaf following bottom-up protocol. Correspondingly, there are two UANs in the method: N, for the bottom-up transformation and $N_2$ for the top-down transformation. Initially, $N_1$ is set to the grandparent of the leftmost leaf node of the original join tree, and $N_2$ is set to the root. At any given time, at most one UAN is active. The active UAN is chosen between the two UANs by comparing their child subtrees: $N_1$ is chosen if the response time of its left child subtree is smaller than that of $N_2$'s right child subtree, and $N_2$ is chosen otherwise. If the response times are about the same, the UAN whose child subtree is unbalanced will be chosen.

A basic transformation is then identified and applied to the active UAN. The transformation will make the child subtree of the active UAN node bigger. The purpose is to keep similar response times for the two subtrees. The method stops when the two UANs meet. When this happens, the UANs become the new root for the balanced join tree, and the two subtrees are child subtrees of the new root.

The method also tries to keep both the left child subtree of $N_1$ and the right child subtree of $N_2$ balanced after each transformation. According to the bottom-up protocol, the NJN resulted from the transformations to $N_1$ is already balanced. We need to balance the NJN after each basic transformation to $N_2$ (i.e., the top-down UAN). Again, the NJN may be unbalanced as LAN's right child subtree could be an arbitrarily large subtree resulted from previous transformations (e.g., FIGS. 6A–6F). In the original top-down method, NJNs are balanced after the load has been evenly distributed for the new root.

The basic top-down approach has also been extended (not shown in the process) in the hybrid method to allow basic transformations which do not improve overall query response time but facilitate future transformation. Similar to the bottom-up approach, transformations are allowed only if UAN's right child subtree is unbalanced. The hope is that subsequent transformations that balance the NJN will improve the overall query response time.

Example #4

FIGS. 12A–12F show how the left deep join tree shown in FIG. 6A and FIG. 9A is transformed into a balanced join tree using the hybrid approach. Again, it only shows steps in which basic transformations have taken place. The two possible UANs are highlighted using arrows such that the active UAN is highlighted using a solid arrow and the passive UAN is indicated with a dashed arrow. Initially, join nodes 128c and 128g are chosen to be two UANs. Join node 128g is the first active UAN as leaf node 120H is smaller than the join node 128b. Join node 128f becomes the new UAN after the transformation and remains active.

Figures 12A, 12B, 12C, 12D, 12E, 12F:
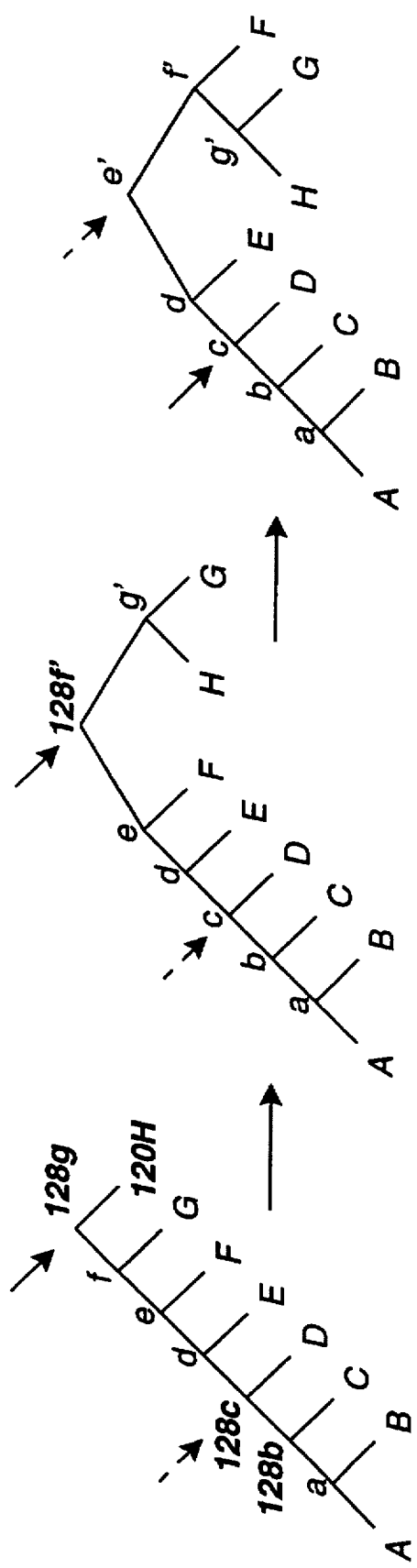
FIGS. 12A–12F show an example of the five step hybrid transformation shown in FIG. 11 as applied to the generic left-deep join tree shown in FIGS. 6A, 9A and 12A, showing intermediate FIGS. 12B–12E, and yielding the balanced bushy tree shown in FIG. 12F.

In FIG. 12D, join node 128e' is the active UAN, not because its child subtree rooted by join 128f has smaller response time than the subtree rooted by join 128c', but because the subtree rooted by join 128f is unbalanced. Please note that the transformation does not reduce the overall query response time. As shown in FIGS. 12E–12F, the subsequent transformation does reduce the overall response time.

Figure 19:
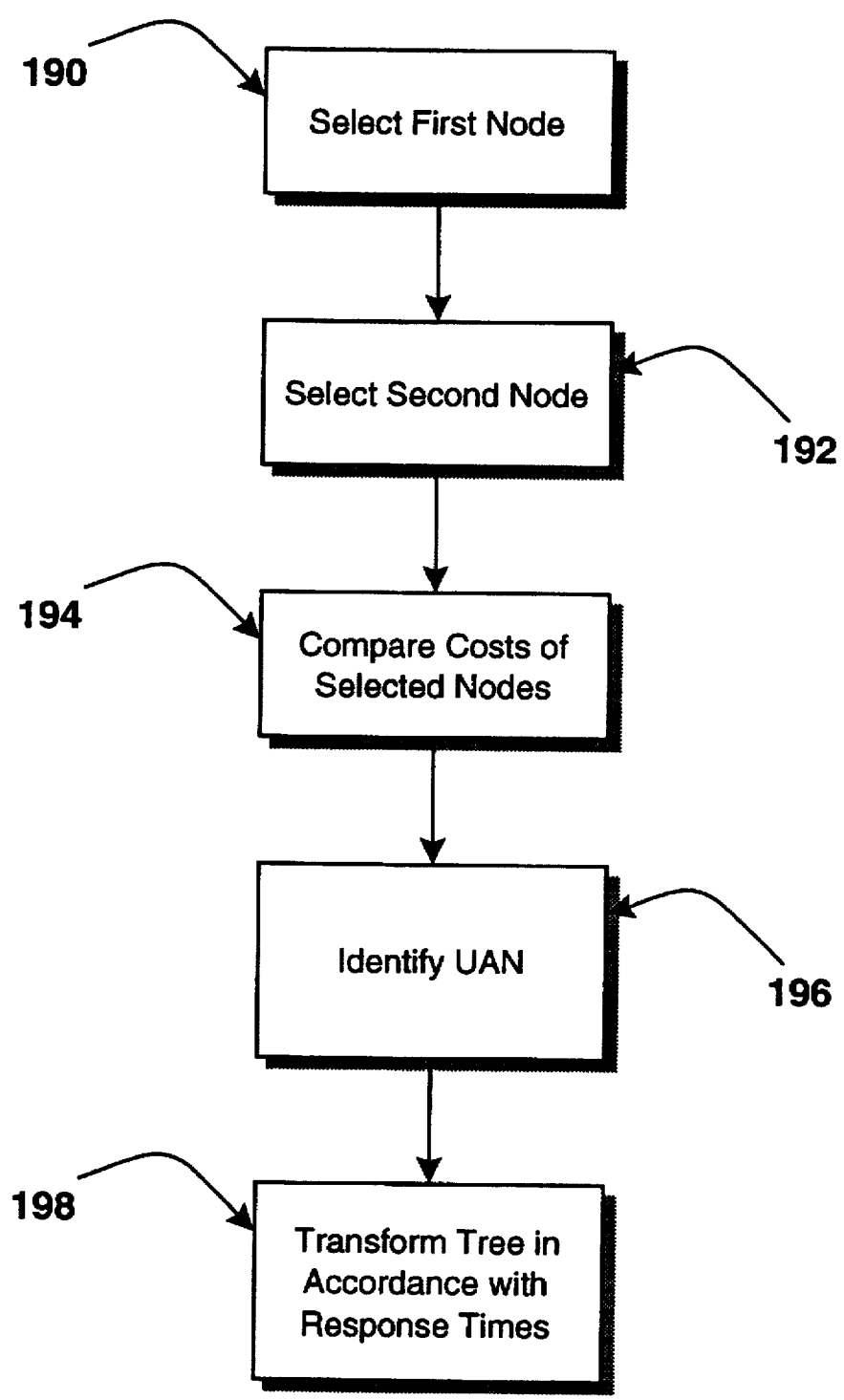
FIG. 19 is a flowchart illustrating the process of implementing the Hybrid Approach according to the invention.

FIG. 19 illustrates, in flowchart form, the basic steps performed within the hybrid approach. The database query optimization system first selects 190 a first node having first left and right child subtrees, wherein said first node being initially defined as the grandparent of the leftmost leaf node. A second node having first left and right child subtrees is then selected in step 192, said second node being initially defined as the root of the left deep join tree. The first and second left and right subtrees are then compared 194, and an upper anchor node (UAN) is consequently defined 196, said UAN being set to said first node only if the cost of the first left child subtree is smaller than the response time of the second right child subtree. Otherwise said UAN is set to said second node. Finally, the optimizer transforms the UAN of the query tree in step 198.

Discussion

The hybrid process has a complexity similar to that of the top-down and bottom-up approaches and thus is similarly nondetrimental to overall query cost. For example, in the worst case as discussed earlier where the leftmost leaf node dominates the total cost at each step, the hybrid process invokes the same number of basic transformations, as the bottom-up UAN will never be activated.

Figure 13B:
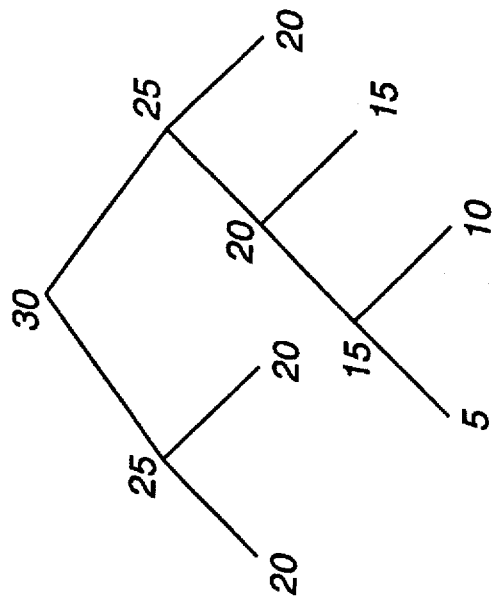
FIGS. 13A and 13B show the results of hybrid transformation on the left-deep join trees in FIG. 7A and FIG. 10, respectively.
Figure 13A:
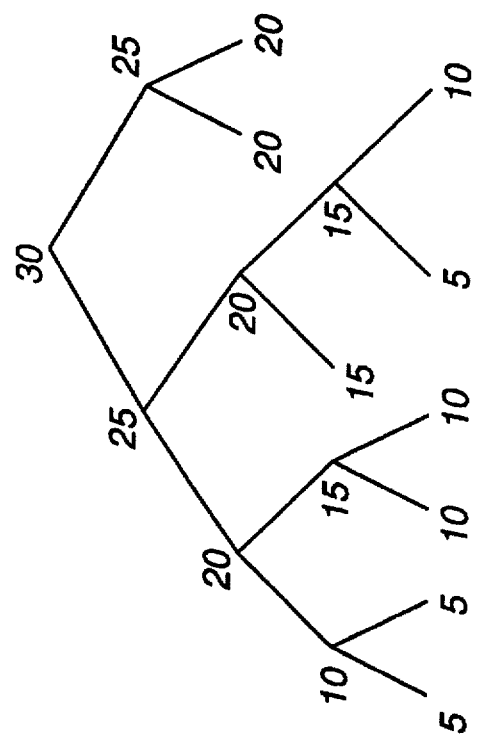

The major advantage of the hybrid approach over top-down and bottom-up approaches is that it generally produces more balanced bushy join trees. Since redistribution of loads is based on the response time of the balanced child subtrees, the problem described in FIGS. 7A–7C, where the child subtrees are not balanced, will not occur. The hybrid approach is also superior to the bottom-up approach as loads are evenly distributed for the new root. FIGS. 13A–13B show the results of hybrid transformation on the left deep join trees in FIG. 7A and FIG. 10 (left side), respectively. They are more balanced than those generated by top-down and bottom-up approaches (FIG. 7B and FIG. 10 (right side).

Again, the hybrid approach does not guarantee the optimality of transformed join trees. It is also possible that either the top-down or bottom-up approach will produce more balanced bushy trees for some left deep join trees. This is possible, for example, for left deep join trees that can be perfectly balanced by the bottom-up approach, but not the top-down approach. The hybrid approach may not produce the best result due to the partially unbalanced right half of the transformed bushy tree that is generated by the top-down approach. The hybrid approach is generally considered to be better than both top-down and bottom-up approaches because it avoids extreme cases that may be produced by the other two, and because it does produce better results for most join trees.

Working with Existing Optimizers

The described transformations are not only useful in reducing response time of multidatabase queries but can be integrated with the existing query optimizers. There are two possible ways that an existing query optimizer can be extended. The two-phase approach divides the entire optimization process into two steps. First, multidatabase queries are optimized (with respect to total resource usage) using the traditional optimization strategy. The resulting left deep join trees are then improved (with respect to response time) using the processes described above. The advantage of the two-phase approach is simple integration. No modification to the existing optimizer is needed.

The second approach is an integrated one which performs basic optimization (with respect to total resource usage) and tree transformation (with respect to response time) concurrently. More specifically, for each subset of join tables, we first obtain the optimal (left deep join) subplan (with respect to total resource usage) using the traditional approach. The subplan is then balanced using the proposed transformations. The improved subplan and the associated cost (both total resource usage and response time) are then stored into the subplan table for future reference. The advantage of the approach is that optimization and transformation may benefit each other and therefore it may result in better execution plans. Disadvantages include complicated integration and bigger overhead.

Relaxing Basic Transformations

There are several concerns in choosing to use either basic transformations or complex ones. The basic principle behind the present invention is to keep the basic transformation simple and leave the burden to the transformation control process. The other approach is to allow complex basic transformations. There is clearly a trade-off between the two approaches. In general, the more flexible a basic transformation is, the fewer steps it takes to balance a query tree. On the other hand, the more flexible a basic transformation is, the more overhead it incurs in a single transformation. There are two reasons. First, the transformation affects a larger segment, and second selection of LANs becomes more complicated.

Another simple extension of the basic transformation is to allow limited increase in total resource usage. Such a transformation can be justified if (1) it yields a big improvement in response time, or (2) it facilitates subsequent transformations. The specification of the allowance can be either absolute or relative (with respect to improvement in response time). Clearly, the relaxation should be done in a controlled way, especially for the second purpose.

Pruning Non-Cost-Improving Basic Transformations

Heuristics can be used to prevent transformations that are unlikely to be cost improving, thereby reducing transformation overhead. For example, a basic transformation is very unlikely to improve the overall cost if there is no equality join predicate for the NJN (e.g., between nodes i and j in FIG. 3). This is consistent with the traditional optimization that delays cross products as late as possible. This can be taken a little further by requiring that the size of the NJN be smaller (at least no greater) than that of LAN's right child node. The intuition behind the heuristic is that small join result may benefit the subsequent joins. In FIG. 3, for example, if the join result of nodes i and j is smaller than node i, the join between the NJN and node i+1 could be cheaper to evaluate and produce smaller result, which in turn benefits the subsequent join with node i+2, and so on.

Conclusion

In multidatabase query optimization, the primary objective is to reduce response time for a total cost optimal multidatabase query execution plan. While other previous work has considered optimization of query response time, the present invention is the first to outline techniques that are specially suited to multidatabase queries. The present invention is motivated by the following observations of multidatabase query execution:

Nested loop join is less frequently used to implement global joins in a multidatabase query due to overhead incurred in each inner table lookup.

Hierarchical delay of sort merge and hash joins are usually large due to the sequential nature of their implementation.

The above features of multidatabase query execution introduce additional difficulties for multidatabase query optimization. On one hand, left deep join trees as generated by the traditional query optimizers for multidatabase queries are often suboptimal, especially with respect to query response time. On the other hand, it is very expensive for a multidatabase query optimizer to conduct an exhaustive search in a large execution space that includes all bushy join trees. The problem is addressed in the present invention by first optimizing multidatabase queries using a traditional optimization strategy and then improving response time of the obtained left deep join trees by using simple tree transformations. Compared to existing strategies, the present invention has the advantages of guaranteed minimum total resource usage, improved response time, and low optimization overhead.

The approaches herein employ particular transformation methods. It should be apparent to those skilled in the art that even if the transformations were changed, or different transformations are devised, they can still be used to implement the new procedure. Having illustrated and described the principles of the invention in preferred embodiments thereof, it should be readily apparent to those skilled in the art that the invention can be modified in arrangement and detail without departing from such principles. We claim all modifications coming within the spirit and scope of the following claims.

We claim:

1. In a multidatabase system (MDBS) for accessing data in a plurality of relational computer databases on a distributed network of database machines, a method of structuring a database query to reduce query response time using a two phase optimization, comprising the steps of:

inputting the database query;

as a first phase, optimization, transforming the database query into a left deep join query tree having a root query, a plurality of subordinate (descendant) query nodes and a plurality of table nodes, each subordinate query node having a left child subtree and a right child subtree;

as a second phase optimization.

estimating a response time for the root query and for each of the plurality of subordinate query nodes;

measuring a response time to access each of the plurality of table nodes and a cost to access each subtree;

balancing the left deep join query tree into a bushy query tree, wherein the cost for each left child subtree is substantially equal to the cost for the right child subtree; and executing the database query in one or more of said relational databases in accordance with an execution plan operating according to the balanced bushy query tree.

2. The method of claim 1, wherein the left deep join query tree includes a plurality of join nodes, at least one of which links two data tables within the query tree, and child subtrees depending from the join nodes, each node being defined by a data structure stored in memory in the MDBS and comprising data defining the response time of each corresponding table and cost for each corresponding join node, and a pointer identified with the data for linking it to its corresponding child subtrees, wherein the step of balancing further comprises the step of changing the pointer link within the corresponding child subtree.

3. The method of claim 1, wherein the step of balancing further comprises the steps of selecting a root node of the left deep join query tree having a corresponding right child subtree and a left child subtree, each with a corresponding cost;

characterizing the root node as an upper anchor node (UAN);

reading a response time of the corresponding right child subtree and a response time of the corresponding left child subtree of the root node;

comparing the corresponding right child tree response time with the corresponding left child tree response time; and transforming a left child node into a new root node of the transformed tree if the cost of the left child subtree is greater than that of the right child subtree.

4. The method of claim 1, wherein the step of balancing further comprises the steps of identifying a lowest leftmost node on the left deep join query tree, wherein the node's left child subtree and right child subtree are not both single table nodes and the cost of the node's left child subtree is greater than the cost of the node's right child subtree;

characterizing the identified lowest leftmost node as an upper anchor node (UAN);

comparing the right child tree response time with the left child tree response time; and transforming the identified lowest leftmost node into a new child node of the left child node of the identified lowest leftmost node.

5. The method of claim 1, wherein the step of balancing further comprises the steps of selecting a first node having first left and right child subtrees, said first node being initially defined as the grandparent of the leftmost leaf node;

selecting a second node having second left and right child subtrees, said second node being initially defined as the root of the left deep join query tree;

comparing the cost for said first and second left and right subtrees;

defining an upper anchor node (UAN), said UAN being set to said first node only if the cost of the first left child subtree is smaller than the response time of the second right child subtree, otherwise said UAN is set to said second node; and transforming the UAN.

6. An apparatus, comprising:

(A) a storage medium;

(B) a computer executable program stored in the storage medium that structures a database query using a two phase optimization to reduce query response time for accessing data in a plurality of relational databases on a distributed network, comprising (a) a first set of instructions that input the database query;

as a first phase optimization, (b) a second set of instructions that transform the database query into a left deep join query tree having a root query, a plurality of subordinate (descendant) query nodes and a plurality of table nodes, each subordinate query node having a left child subtree and a right child subtree;

as a second phase optimization, (c) a third set of instructions that estimate a response time for the root query and for each of the plurality of subordinate query nodes;

(d) a fourth set of instructions that measure a response time to access each of the plurality of table nodes and a cost to access each subtree;

(e) a fifth set of instructions that balance the left deep join query tree into a bushy query tree, wherein the cost for each left child subtree is substantially equal to the cost for the right child subtree; and (f) a sixth set of instructions that execute the database query in one or more of said relational databases in accordance with an execution plan operating according to the balanced bushy query tree.

7. The apparatus of claim 6, wherein the left deep join query tree includes (1) a plurality of join nodes, at least one of which links two data tables, (2) child subtrees depending from the join nodes, each node being defined by a data structure stored in a memory and comprising data defining the response time of each corresponding table and cost for each corresponding join node, and (3) a pointer identified with the data for linking it to its corresponding child subtrees.

8. The apparatus of claim 7, wherein the fifth set of instructions further comprises instructions that change the pointer link within the corresponding child subtree.

9. The apparatus of claim 6, wherein the fifth set of instructions further comprises instructions that select a root node of the left deep join query tree having a corresponding right child subtree and a left child subtree, each with a corresponding cost;

instructions that characterize the root node as an upper anchor node (UAN);

instructions that read a response time of the corresponding right child subtree and a response time of the corresponding left child subtree of the root node;

instructions that compare the corresponding right child tree response time with the corresponding left child tree response time; and instructions that transform a left child node into a new root node of the transformed tree if the cost of the left child subtree is greater than that of the right child subtree.

10. The apparatus of claim 6, wherein the fifth set of instructions further comprises instructions that identify a lowest leftmost node on the left deep join query tree, wherein the node's left child subtree and right child subtree are not both single table nodes and the cost of the node's left child subtree is greater than the cost of the node's right child subtree;

instructions that characterize the identified lowest leftmost node as an upper anchor node (UAN);

instructions that compare the right child tree response time with the left child tree response time; and instructions that transform the identified lowest leftmost node into a new child node of the left child node of the identified lowest leftmost node.

11. The apparatus of claim 6, wherein the fifth set of instructions further comprises instructions that select a first node having first left and right child subtrees, said first node being initially defined as the grandparent of the leftmost leaf node;

instructions that select a second node having second left and right child subtrees, said second node being initially defined as the root of the left deep join query tree;

instructions that compare the cost for said first and second left and right subtrees;

instructions that define an upper anchor node (UAN), said UAN being set to said first node only if the cost of the first left child subtree is smaller than the response time of the second right child subtree, otherwise said UAN is set to said second node; and instructions that transform the UAN.

* * * * *